(12) United States Patent
Kamen et al.

(10) Patent No.: US 7,131,706 B2
(45) Date of Patent: *Nov. 7, 2006

(54) MECHANICAL IMPROVEMENTS TO A PERSONAL VEHICLE

(75) Inventors: Dean L. Kamen, Bedford, NH (US); Robert R. Ambrogi, Manchester, NH (US); Richard Kurt Heinzmann, Francestown, NH (US); Christopher C. Langenfeld, Nashua, NH (US); Marc A. Nisbet, Loudon, NH (US); Stanley B. Smith, III, Raymond, NH (US); Thomas Alan Brindley, Livonia, MI (US)

(73) Assignee: Deka Products Limited Partnership, Manchester, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/818,386

(22) Filed: Apr. 5, 2004

(65) Prior Publication Data

US 2004/0183272 A1   Sep. 23, 2004

Related U.S. Application Data

(62) Division of application No. 09/978,711, filed on Oct. 16, 2001, now Pat. No. 6,715,845, which is a division of application No. 09/325,463, filed on Jun. 3, 1999, now Pat. No. 6,405,816.

(51) Int. Cl.
 *B60B 23/00* (2006.01)
(52) U.S. Cl. .................. 301/111.03; 301/113; 180/65.1
(58) Field of Classification Search ............. 280/250.1, 280/304.1; 301/111.03, 131, 134; 403/1, 403/22, 374.1, 409.1
See application file for complete search history.

(56) References Cited

U.S. PATENT DOCUMENTS

| | | | | |
|---|---|---|---|---|
| 4,210,372 A | * | 7/1980 | McGee et al. | 384/584 |
| 4,392,690 A | * | 7/1983 | Anderson | 301/121 |
| 4,630,506 A | * | 12/1986 | Allmandinger et al. | 475/230 |
| 4,881,842 A | * | 11/1989 | Farrell et al. | 403/19 |
| 5,447,362 A | * | 9/1995 | Nagano | 301/111.03 |
| 6,715,845 B1 | * | 4/2004 | Kamen et al. | 301/111.03 |

* cited by examiner

*Primary Examiner*—Lesley D. Morris
*Assistant Examiner*—L. Lum
(74) *Attorney, Agent, or Firm*—Bromberg & Sunstein LLP

(57) ABSTRACT

Improvements to personal vehicles including self-propelled and balancing personal vehicles. Ready detachability of a seat, footrest, seat back, control unit, wheels and caster assembly is provided using quick disconnect mechanisms.

3 Claims, 29 Drawing Sheets

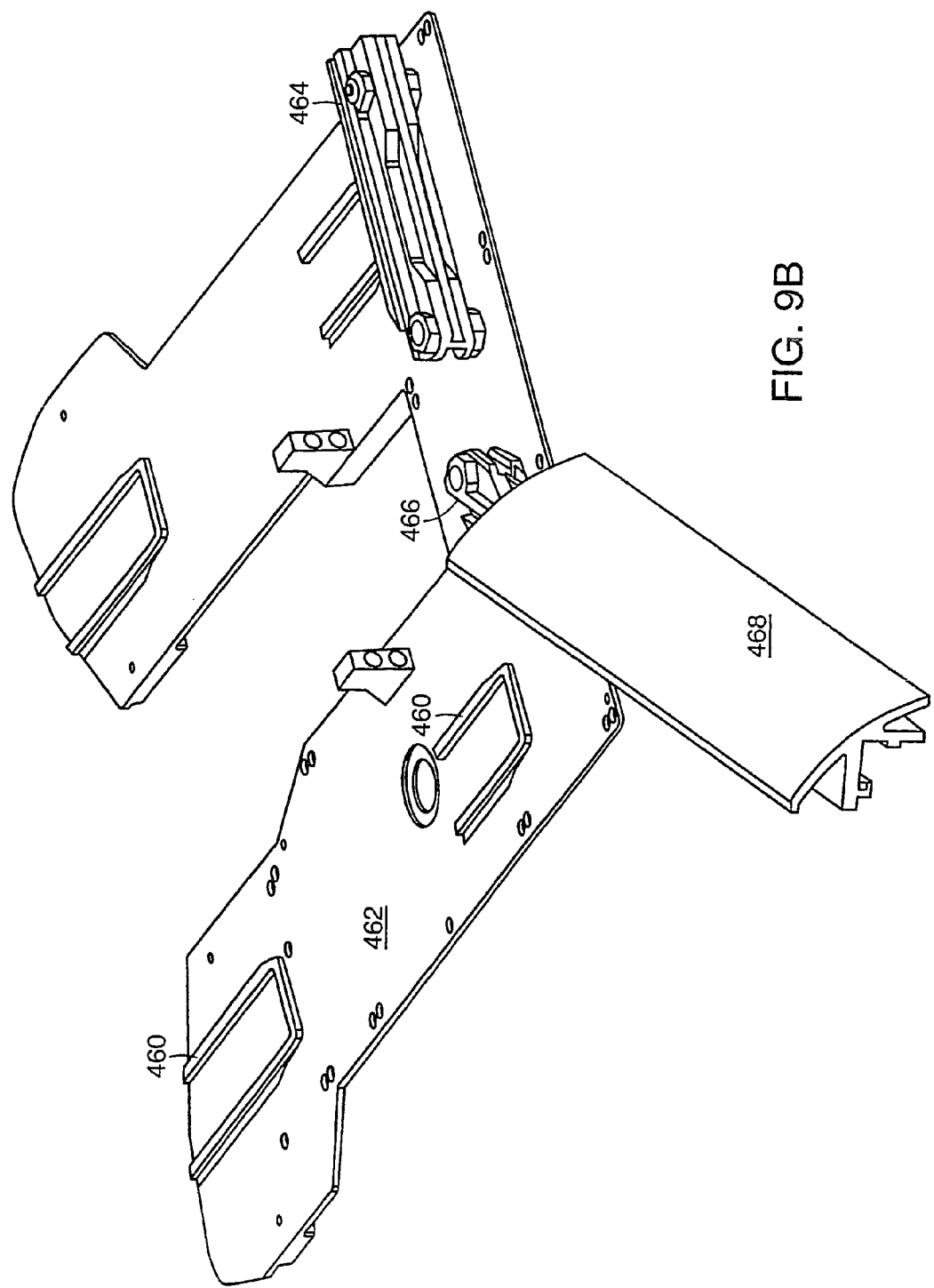

MECHANICAL IMPROVEMENTS TO A PERSONAL VEHICLE

The present application is a divisional application of Ser. No. 09/978,711, filed Oct. 16, 2001 now U.S Pat. No. 6,715,845, itself a divisional application of Ser. No. 09/325,463, filed Jun. 3, 1999 now U.S. Pat. No. 6,405,816. Each of these applications is hereby incorporated herein by reference.

TECHNICAL FIELD

The present invention pertains to mechanical improvements to personal vehicles including self-propelled personal vehicles.

BACKGROUND OF THE INVENTION

Personal vehicles, such as may be used by handicapped persons, may be self-propelled and user-guidable, and, further, may entail stabilization in one or more of the fore-aft or lateral planes, such as when no more than two wheels are in ground contact at a time. More particularly, such vehicles may include one or more clusters of wheels, with wheels in each cluster capable of being motor-driven independently of the cluster in its entirety. One example of such a vehicle is described in U.S. Pat. No. 5,701,965, which is incorporated herein by reference. Since personal vehicles operate under stringent constraints of weight and power, the features of such vehicles are typically limited to those essential to the propulsion of the vehicle, with safety left largely in the hands of the operator, and comfort largely foregone. Vehicles of this sort may be more efficiently and safely operated employing mechanical features supplementary to those described in the prior art.

SUMMARY OF THE INVENTION

In accordance with a preferred embodiment of the invention, there is provided a personal vehicle for carrying a payload including a user. The vehicle has a ground-contacting module that supports the payload and has at least one ground-contacting member. The vehicle also has a motorized drive arrangement, mounted to the ground-contacting module, that causes automatically balanced operation of the vehicle in an operating position that is unstable with respect to tipping when the motorized drive arrangement is not powered. The vehicle has a seat for supporting the user, the seat being coupled to the ground-contacting module in such a manner that the seat may be removed without the use of a tool, such as by means of a quick-disconnect assembly.

In accordance with another embodiment of the present invention, the personal vehicle has a footrest coupled to the ground-contacting module for supporting the foot of the user, where the footrest may also be decoupled from the ground-contacting module without the use of a tool. The footrest may be coupled to the ground-contacting module through the seat assembly such as by means of a mounting pin inserted in a J slot.

In accordance with another embodiment of the invention, there is provided a personal transportation vehicle having a seat back coupled to the seat assembly, the seat back being tiltable with respect to the seat assembly. The vehicle may also have a sensor arrangement that provides a signal corresponding to the tilt of the seat back. The seat back may be positionable at one of a plurality of positions provided with respect to the seat assembly, thereby positioning the CG of the user at a desired position with respect to the ground-contacting module.

In accordance with further embodiments of the invention, the personal vehicle may have at least one caster capable of being brought into engagement with the ground during operation of the vehicle. In one embodiment of the invention, motion of the caster in a direction having a vertical component is coordinated with motion of the seat assembly of the vehicle.

The caster assembly may be decoupled from the ground-contacting module without the use of a tool, and may include a suspension mechanism for dampening transmission of vibration to the vehicle.

In accordance with another embodiment of the invention, the personal vehicle may have a power module disposed substantially beneath the seat assembly and contained substantially within the areal projection in the horizontal plane of the seat assembly. The personal vehicle may have a user interface module for permitting a user to command the motorized drive arrangement and a differentially frangible coupling for attaching the user interface module to the support structure.

In accordance with yet another embodiment of the invention, the personal vehicle may have a belt tensioning mechanism for tensioning a belt that transmits torque from a motor to a rotary member having an axis of rotation. The belt tensioning mechanism has a motor having a roller for engaging the belt and a cam plate. The cam plate has a slot ridge for receiving the motor, a rotation ridge disposed eccentrically with respect to the slot ridge, and a plurality of circumferential sprocket teeth. Finally, the tensioning mechanism has a transmission plate fixed with respect to the axis of rotation of the rotary member, the motor having a rotational orientation defined with respect to the transmission plate, the transmission plate having a substantially elliptical cam plate rotation shelf for receiving the cam plate rotation ridge such that a lateral position of the motor with respect to the transmission plate may be changed by rotation of the cam plate while the rotational orientation of the motor remains substantially constant.

The personal vehicle may have a self-pulling mechanism for a wheel having a tapered axle bore and a hub. The self-pulling mechanism has an axle having a taper corresponding the bore of the wheel and a threaded end, a retaining ring seated on an inside groove of the hub of the wheel, and a wheel nut having a threaded bore corresponding to the threaded end of the axle such that upon tightening the wheel is retained on the axle and upon loosening a force is applied to the retaining ring for removing the wheel from the axle.

In accordance with alternate embodiments of the invention, there is provided a vehicle for carrying a payload having a power module with left and right compartments capable of interchangeably receiving a power pack, where the respective compartments of the power module may be coupled to redundant power circuits. The personal vehicle of embodiments of the present invention may also have a handle having an adjustable extension for retention by an assistant in operating the vehicle.

BRIEF DESCRIPTION OF THE DRAWINGS

The invention will be more readily understood by reference to the following description, taken with the accompanying drawings, in which:

FIGS. 9A and 9B show a battery retention assembly, including rails for rapid battery switchout, for use in a personal vehicle in accordance with an embodiment of the present invention;

DETAILED DESCRIPTION OF PREFERRED EMBODIMENTS

Figure 1A:
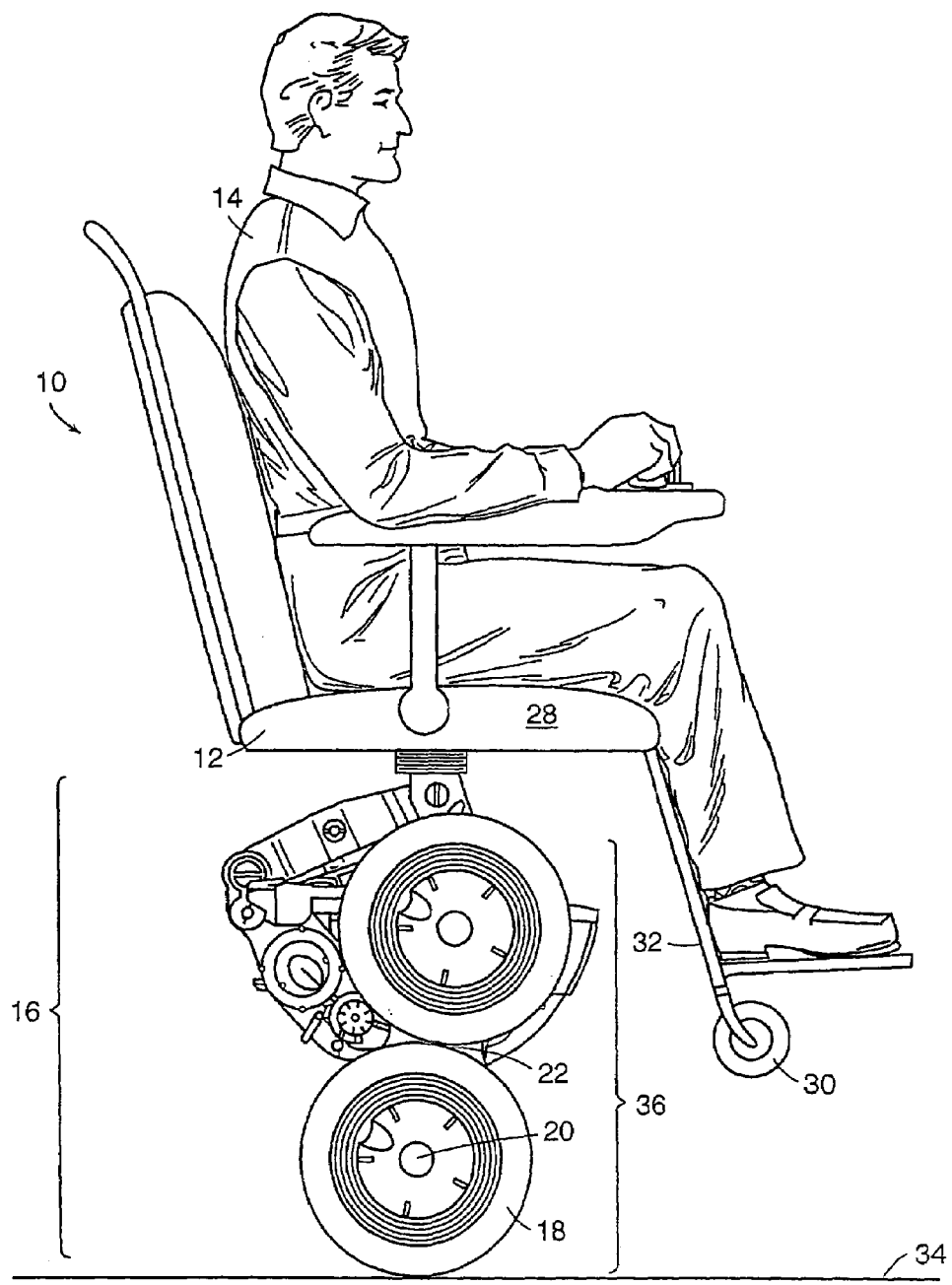
FIG. 1A is a side view of a personal vehicle employing embodiments of the present invention.

Referring to FIG. 1A, a side view is shown of a personal vehicle, designated generally by numeral 10. Vehicle 10 may be described in terms of two fundamental structural components: a support 12 for carrying a passenger 14 or other load, and a ground-contacting module 16 which provides for transportation of support 12 across the ground, or, equivalently, across any other surface. The passenger or other load may be referred to herein and in any appended claims as a "payload." As used in this description and in any appended claims, the term "ground" will be understood to encompass any surface upon which the vehicle is supported.

A mechanism and process for automatically balanced operation of the vehicle in an operating position that is unstable with respect to tipping when the motorized drive arrangement is not powered is described in Kamen '965 column 3, line 55 through column 5, line 44.

Referring further to FIG. 1A, the modes of operation described herein apply to vehicles having one or more ground-contacting elements 18, where each ground-contacting element is movable about an axis 20 and where the axis corresponding to a ground-contacting member can itself be moved. For example, ground-contacting element 18 may be a wheel, as shown, in which case axis 20 corresponds to an axle about which the wheel rotates. Active control of the position of the axis 20 about which ground-contacting element 18 rotates may be tantamount to active suspension of the vehicle in that the position may be controlled in response to specified conditions of the traversed surface or specified modes of operation of the vehicle.

Motion of axes 20 of respective ground-contacting elements is referred to in this description and in any appended claims as "cluster motion." Wheels 18 may be movable in sets, with the moving assembly referred to as a cluster 36. Cluster motion is defined with respect to a second axis 22, otherwise referred to as a "cluster joint." Additional driven degrees of freedom may be provided, such as motion of the second axis about one or more pivots which may, in turn, allow the height of seat 28 to be varied with respect to the ground. Alternatively, seat height may be varied by means of a telescoping post, or by means of any other mechanical artifice. An actuator may be associated with each driven degree of freedom and controlled using control strategies discussed in detail below. In preferred embodiments of the invention, the actuators include wheel servo-motors and cluster servo-motors, with current supplied to the respective motors by servo amplifiers. Additionally, non-driven wheels may be provided, such as casters or pilot wheels 30 coupled to footrest 32 or otherwise to support 12.

An advantage to providing one or more caster wheels 30 coupled to footrest 32 is that such caster wheels may be engaged or disengaged with the ground 34 by controlling the height of seat (or support) 12 with respect to ground-contacting elements 18. The engagement of caster wheel 30 for traversing curbs or other ground obstacles may comprise part of a control mode of the vehicle, as taught in copending U.S. provisional patent application, Ser. No. 60/124,403, filed Mar. 16, 1999, which is incorporated herein by reference. It is to be understood that one or more caster wheels 30 may also be provided aft of support 12, and may be coupled to the support or, alternatively, may be controlled so as to be governed by the height of support 12 with respect to ground-contacting elements 18. It is not required, within the scope of the invention, that a particular caster be in contact with the ground during all, or indeed any, of the duration of operation of the vehicle.

Figure 1B:
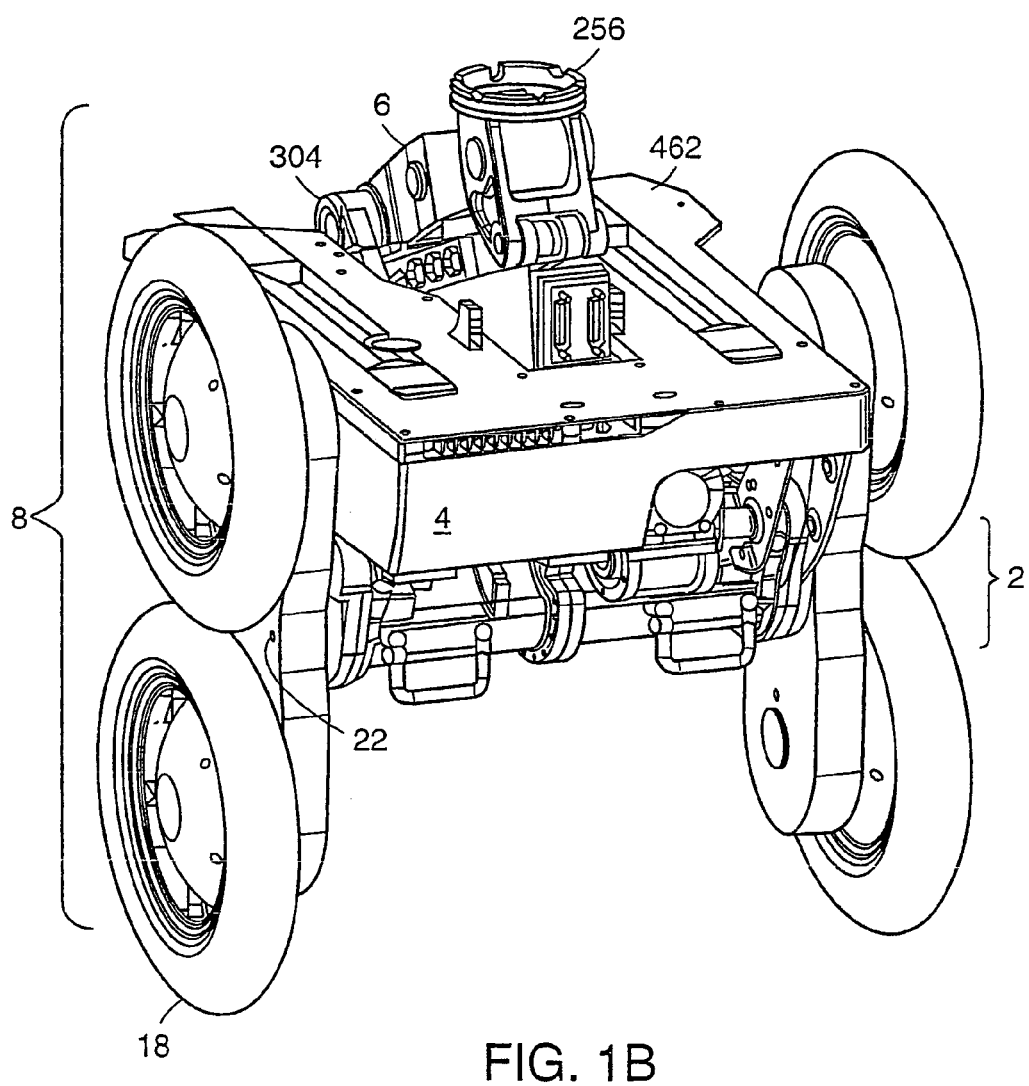
FIG. 1B is a rear view of the power base of the personal vehicle of FIG. 1A.
Figure 1C:
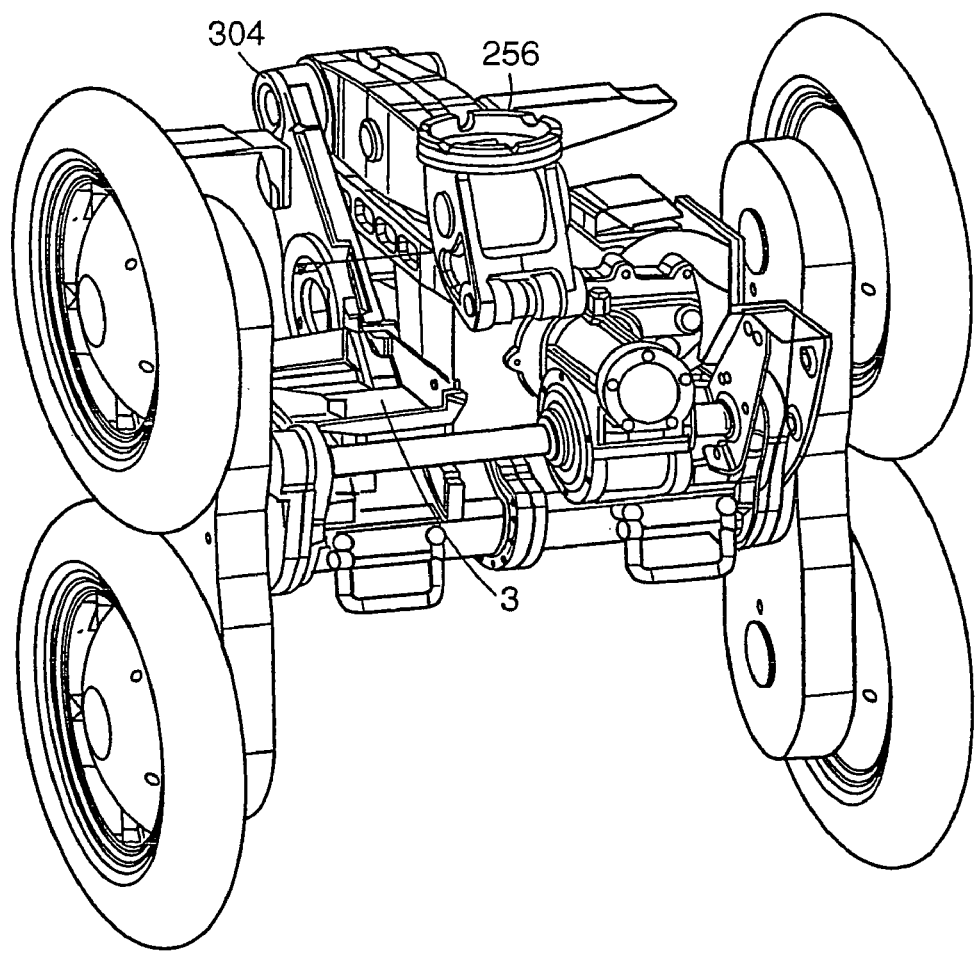
FIG. 1C shows the same view as FIG. 1B, with the battery tray removed to show the position of the electronics box.

Referring to FIG. 1B, seat 12 is coupled to power base 8 of the personal vehicle at seat connection flange 256. Seat height is adjusted by seat height mechanism 6. In order to allow traversal by personal vehicle 10 of terrain of varied surface structure or varied topologies such as stairs, personal vehicle 10, it is advantageous to maximize clearance both beneath the vehicle and aft of the vehicle, the latter to permit maximal maneuverability on descending stairs. Under circumstances where a vehicle is not actively stabilized, it might be advantageous to optimize the distribution of components in order simply to lower the center of gravity in the interest of stability. In an actively stabilized vehicle, and in accordance with preferred embodiments of the invention, electronics module 4 and power pack shelf 462 are advantageously disposed above cluster axis 22. Additionally, the rear contour of ground-contacting module is cut away in a convex contour in region 2, to provide clearance for the vehicle upon descent of stairs. Electronics compartment 4 contains controller tray 2, as shown in FIG. 1C.

Figure 2:
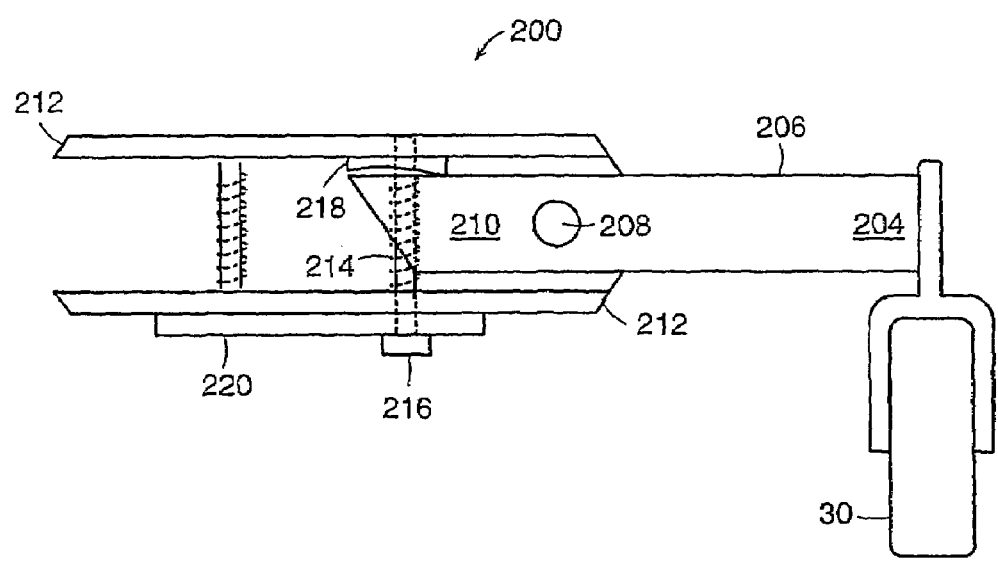
FIG. 2 shows a front cross-sectional view of a swing-arm caster wheel suspension assembly in accordance with an embodiment of the present invention.
Figure 3:
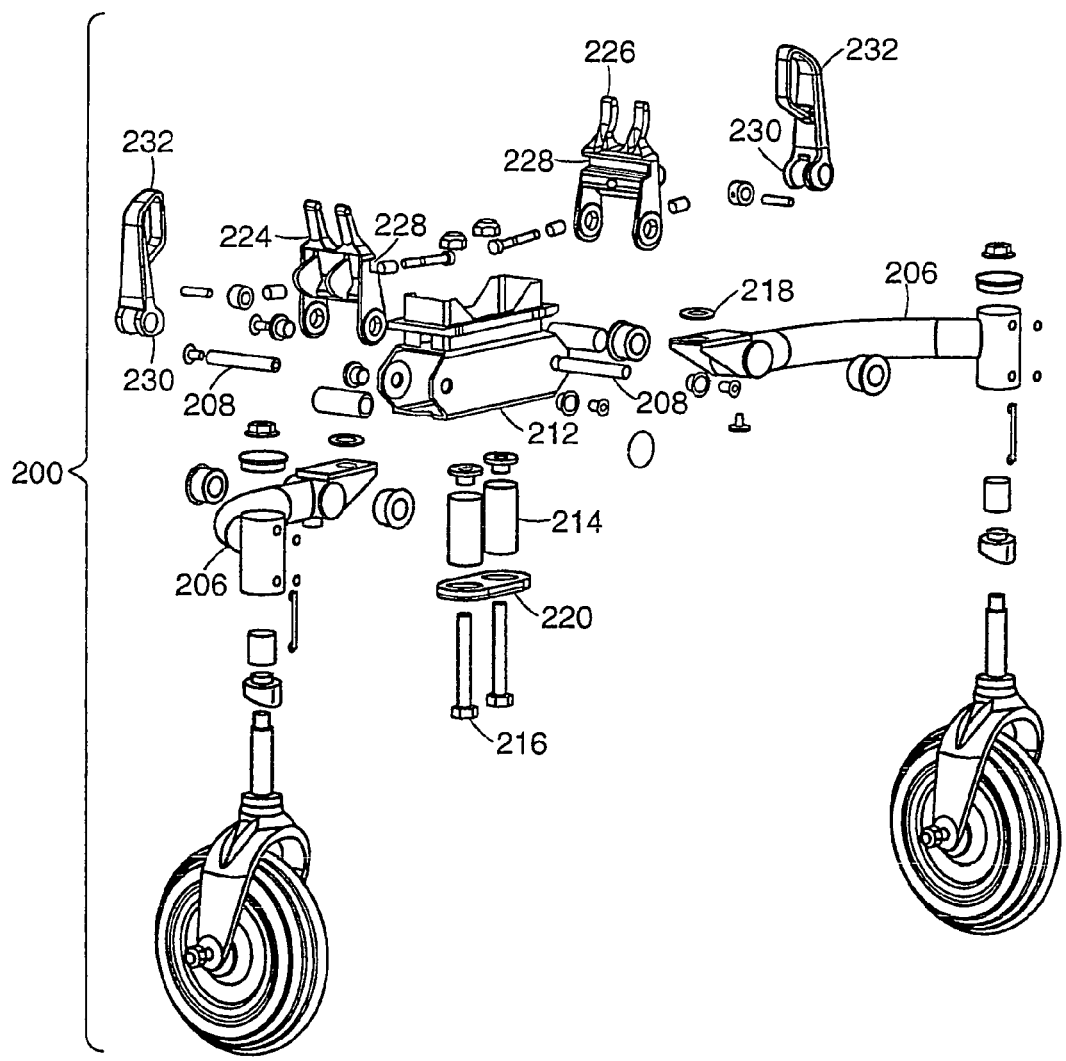
FIG. 3 is an exploded view of the caster wheel suspension assembly of FIG. 2.

Under circumstances where one or more caster wheels 30 engage the ground during operation of the personal vehicle 10, it is advantageous to reduce the transmission of vibration to the payload of the vehicle, for the safety and comfort of the passenger. Referring now to FIGS. 2 and 3, wherein identical numerals identify the same or similar features of the invention, a preferred embodiment of the invention is shown that provides an intermediate structure to dampen vibration and shock loads that would otherwise be transmitted from a caster to the vehicle and payload. FIG. 2 shows a cross-sectional view is shown of suspension 200, looking toward the vehicle from the front. Caster 30, coupled to distal end 204 of caster arm 206, engages the ground under circumstances discussed above. Caster arm 206 is pivotable about pivot 208 which may be a pin 208 as shown in FIG. 3. Proximal end 210 of caster arm 206 is engaged within caster housing 212. Compression spring 214 is axially retained in compression about bolt 216 between caster housing 212 and preloading plate 220. Compression spring 214 pushes upward on proximal end 210 of caster arm 206, urging the caster arm against washer 218 and caster housing 212.

Thus, in accordance with an embodiment of the invention shown in FIGS. 2 and 3, suspension 200 may be preloaded by virtue of compression spring 214 applying an upward force on the proximal end 210 of caster arm 206. The upward force on proximal end 210 acts about pivot 208 to keep caster wheel 30 in contact with the ground. Caster wheel 30 may advantageously respond to bumps and dips in the ground surface because spring 214 takes up, as potential energy, that kinetic energy that would otherwise be transmitted to the payload. FIG. 3 shows an exploded view of the components of the swing-arm caster wheel suspension assembly of FIG. 2. Caster arms 206 are shown pivotable about pivot pins 208 which traverse caster housing 212. Springs 214 are also shown as are washer 218, bolts 216, and preloading plate 220.

Figure 4:
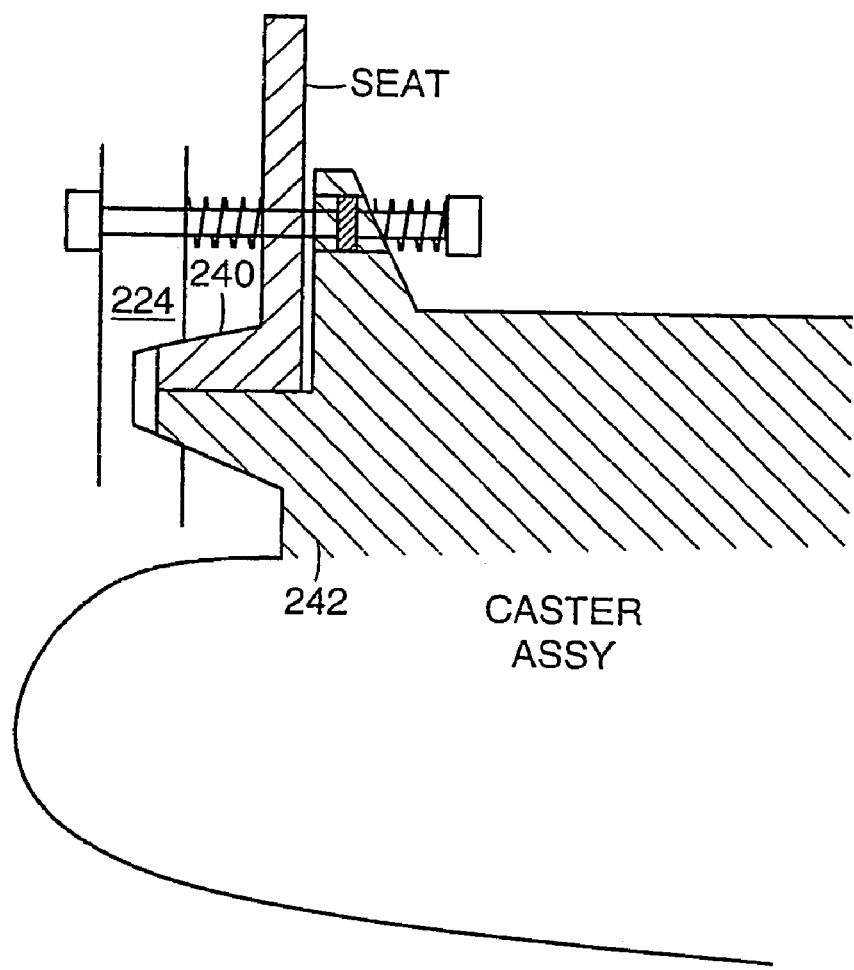
FIG. 4 shows a front view in cross section of a mechanism for coupling the caster suspension assembly of FIGS. 2 and 3 to a member of a personal vehicle in accordance with an embodiment of the present invention.

Another feature of caster suspension 200 is now described with reference to FIG. 3 and with additional reference to FIG. 4. In accordance with a preferred embodiment of the invention, caster suspension is coupled to a caster mount 222 (shown in FIG. 10A) through which caster suspension 200 is, in turn, coupled to support 12 (shown in FIG. 1), i.e., to the seat assembly. For purposes of storage or for ready transportation of the personal vehicle in an automobile, for example, it is advantageous that the vehicle be readily collapsible, and, in particular, it is advantageous that caster suspension 200 be readily detachable from its coupling to the support assembly. Caster housing 212 is clamped to caster mount 222 by means of a pair of quick-disconnect clamps 224 and 226. Quick-disconnect clamps 224 and 226 each contain wedged slots 228 that apply lateral force to mating flanges of caster housing 212 and caster mount 222, thereby retaining them with a small clamping force applied by cams 230 as latch levers 232 are rotated to urge quick-disconnect clamps 224 and 226 about caster housing 212 and caster mount 222. A cross-sectional view of flange 240 of the seat assembly and flange 242 of the caster suspension as clamped by quick-connect wedge clamp 224 is shown in FIG. 4. Wedge clamps 224 and 226 and latch levers 232 are pivotably coupled to caster housing 212 and are retained with the caster suspension assembly 200 upon disassembly from the vehicle.

Figure 5B:
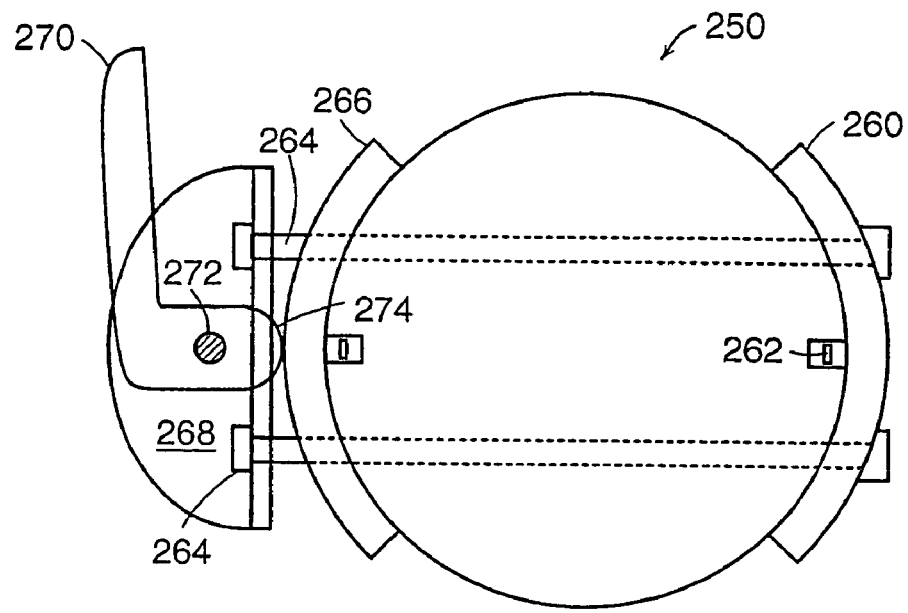
FIGS. 5A–5B show side and top cross-sectional views of a seat supporting assembly for a personal vehicle showing a quick-disconnect coupling and latch assembly in accordance with an embodiment of the present invention.
Figure 5A:
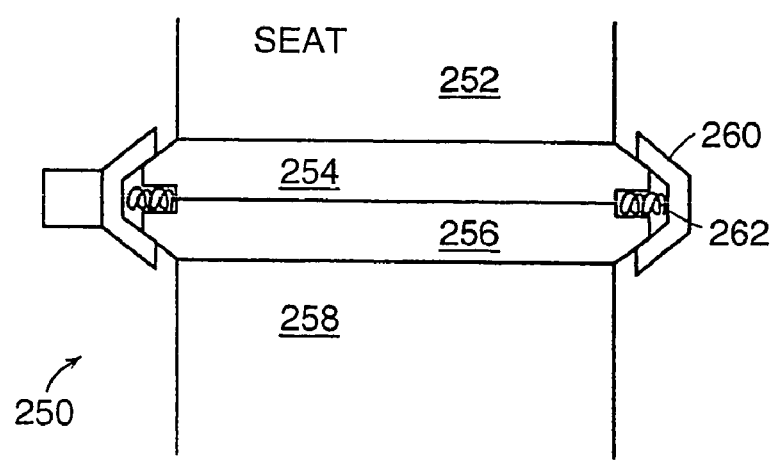

Referring now to FIG. 5A, a side view is shown in cross-section of a quick seat disconnect assembly 250 for a personal vehicle 10. Seat stem 252 terminates at flange 254 which is tapered in conjunction with a corresponding taper on flange 256 of vehicle base 258 in such a manner that Marmon or jaw clamps 260 may be applied to couple flanges 254 and 256. Seat stem 252 is thus readily disconnected from vehicle base 258 without requiring the use of a tool. Springs 262 are mounted between flanges 254 and 256 so as to urge clamps 260 outward. Referring now to FIG. 5B, a pair of bolts 264 connect clamps 260 and 266 and prevent the clamps from falling off flanges 254 and 256. Bolts 264 are attached to handle housing 268. Handle housing 268 contains a handle 270, pivotally mounted about pivot 272 with respect to handle housing 268. Handle 270 is shaped such that in one position end 274 of handle 270 applies a force against clamp 266 adjacent to handle housing 268. When handle 270 is rotated, the force on clamp 266 is removed and clamps 260 and 266 can be removed and seat stem 252 disconnected from vehicle base 258.

Figure 6A:
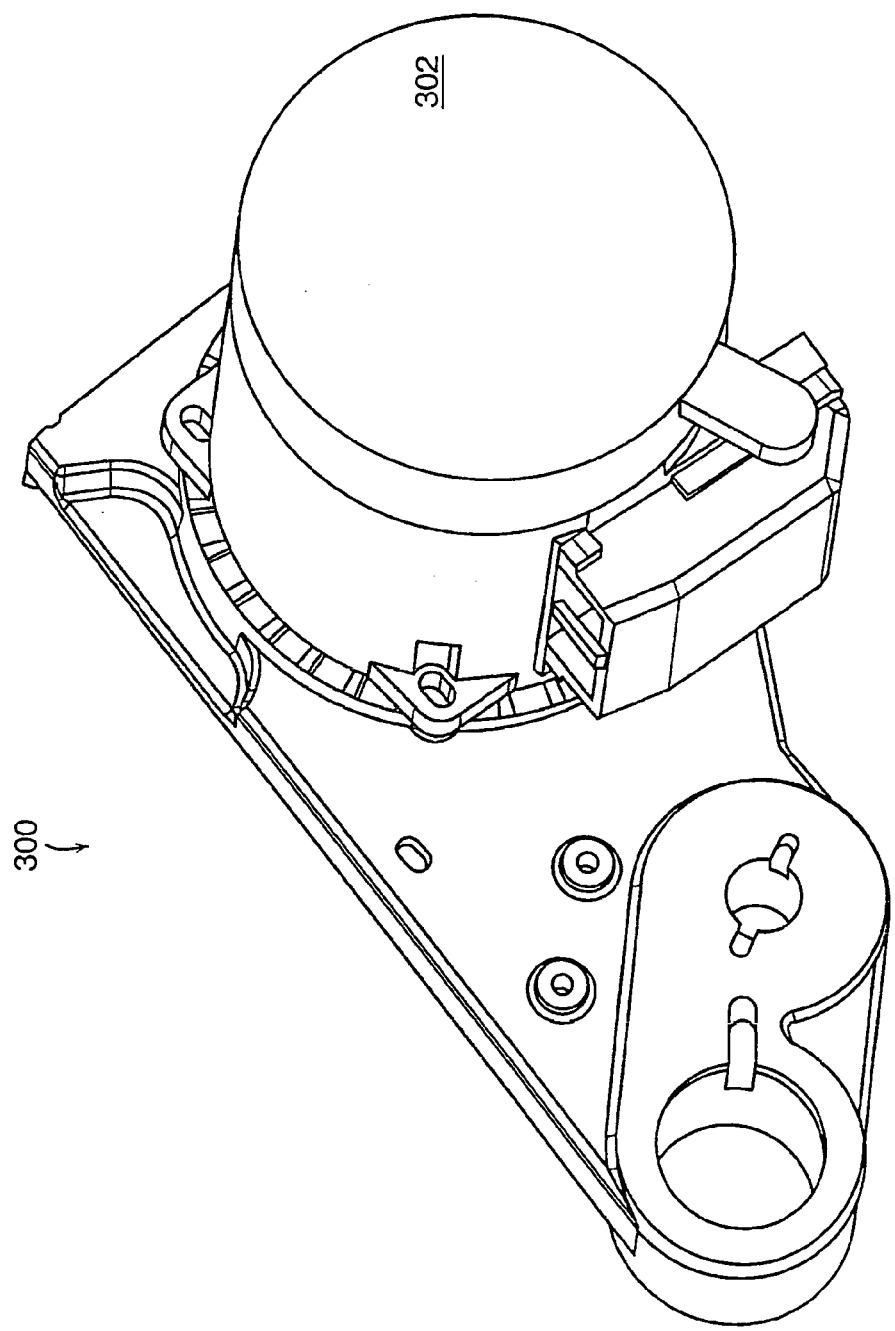
FIGS. 6A–6D show views of a transmission plate with drive motor mounting cam plate in accordance with an embodiment of the present invention.
Figure 6B:
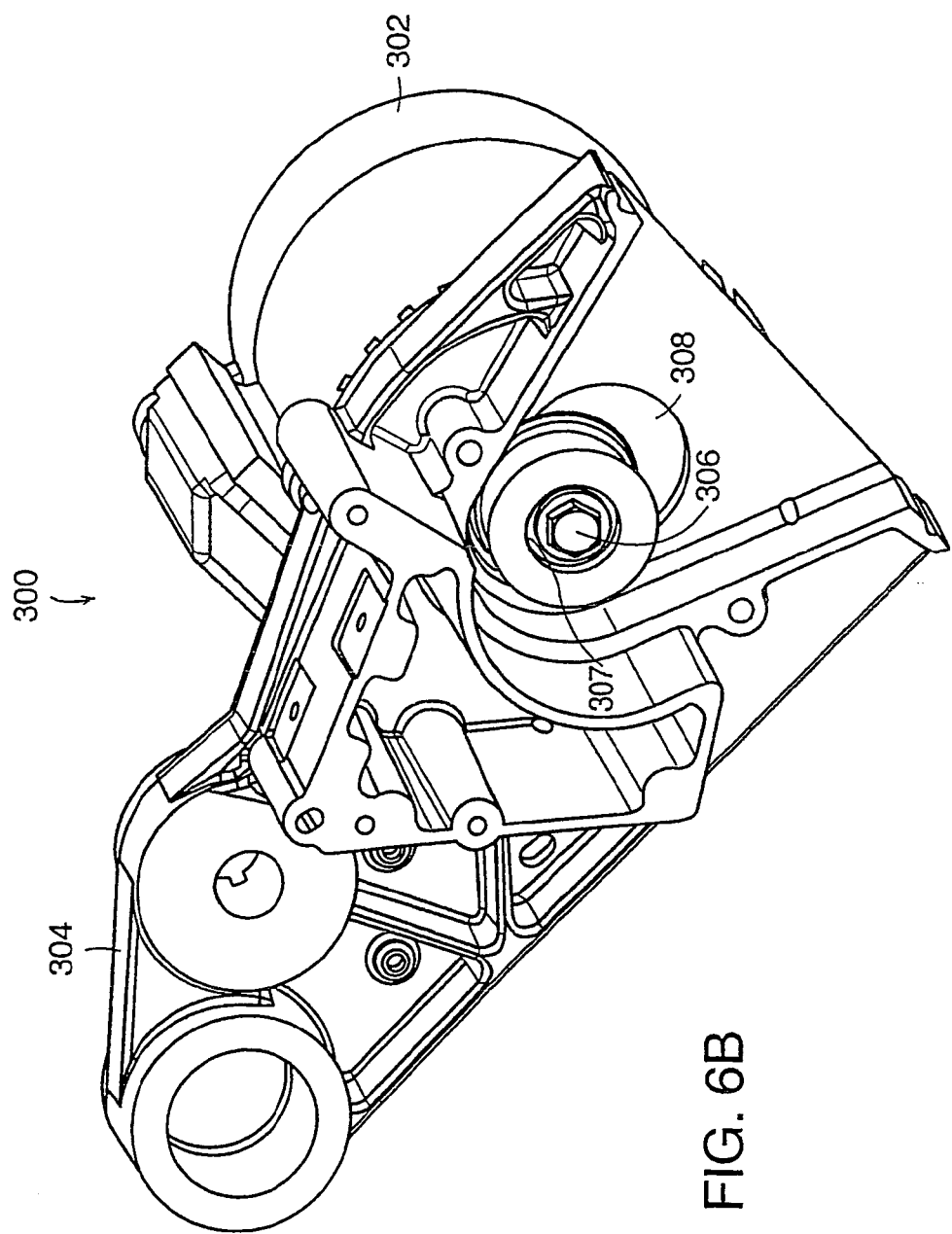

Referring now to FIGS. 6A–6D, views are shown of a transmission belt tensioning mechanism 300 advantageously employed in the wheel drive of personal vehicle 10 in accordance with a preferred embodiment of the invention. Referring first to the outside view of FIG. 6A, belt tensioning mechanism 300 may advantageously conserve the angular orientation of wheel motor 302 so that power and control cables (not shown) need not be disturbed as the position of wheel motor 302 is translated with respect to wheel transmission plate 304 in order to tension a belt or chain or other endless loop driven by the shaft of wheel motor 302. The view of FIG. 6A is referred to herein as an 'anterior' view of the transmission plate. FIG. 6B shows the posterior side of transmission plate 304 and, more particularly, shows shaft 306 of wheel motor 302 extending through wheel transmission plate 304. Belt roller 307 is rigidly coupled to motor shaft 306 for transmission of torque to a belt (not shown). Similarly, a sprocket may also be provided for driving a chain in an analogous manner. From this view, it is clear that motor shaft 306 extends through eccentric shaft opening slot 308, the function of which will now be described.

Figure 6C:
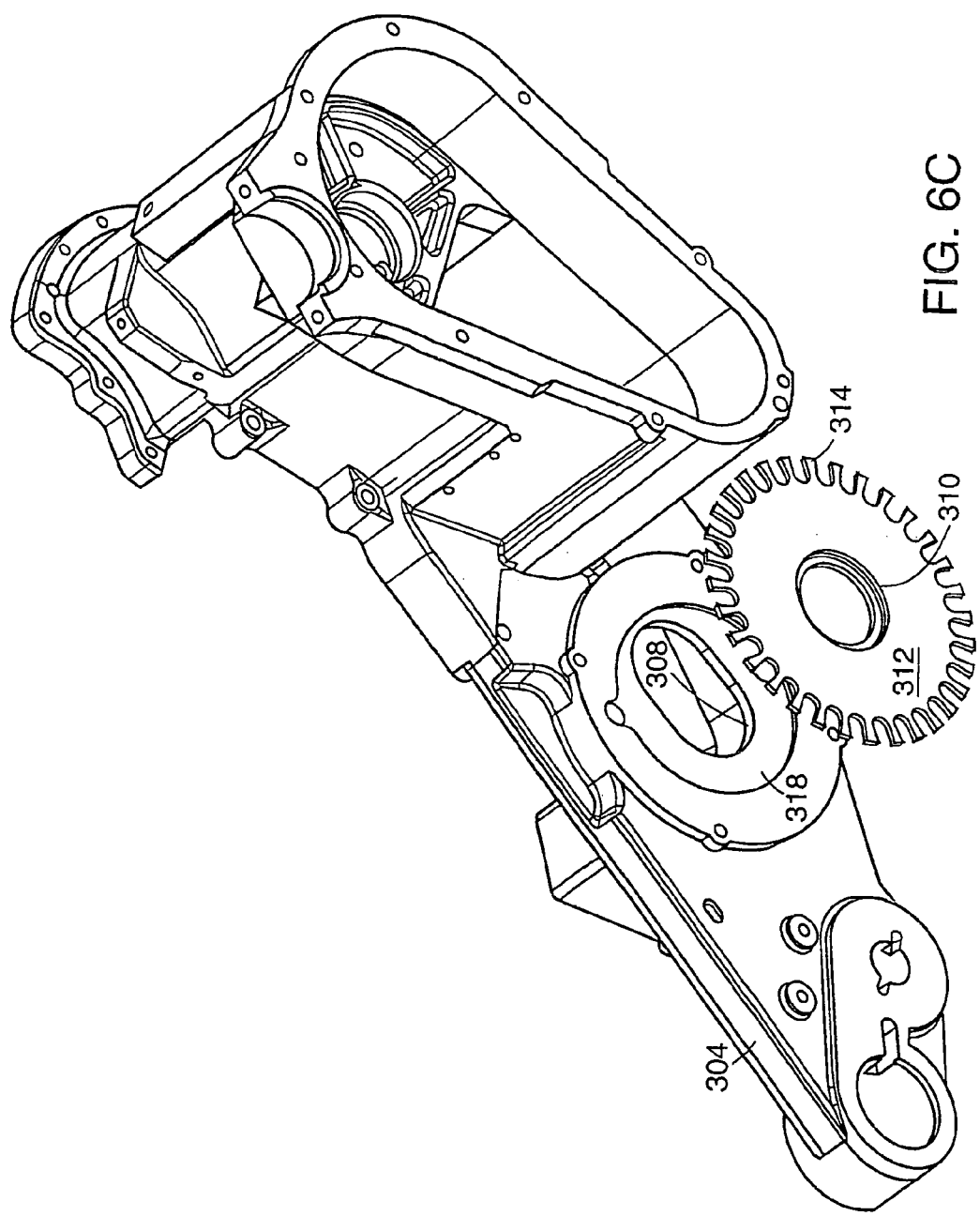
Figure 6D:
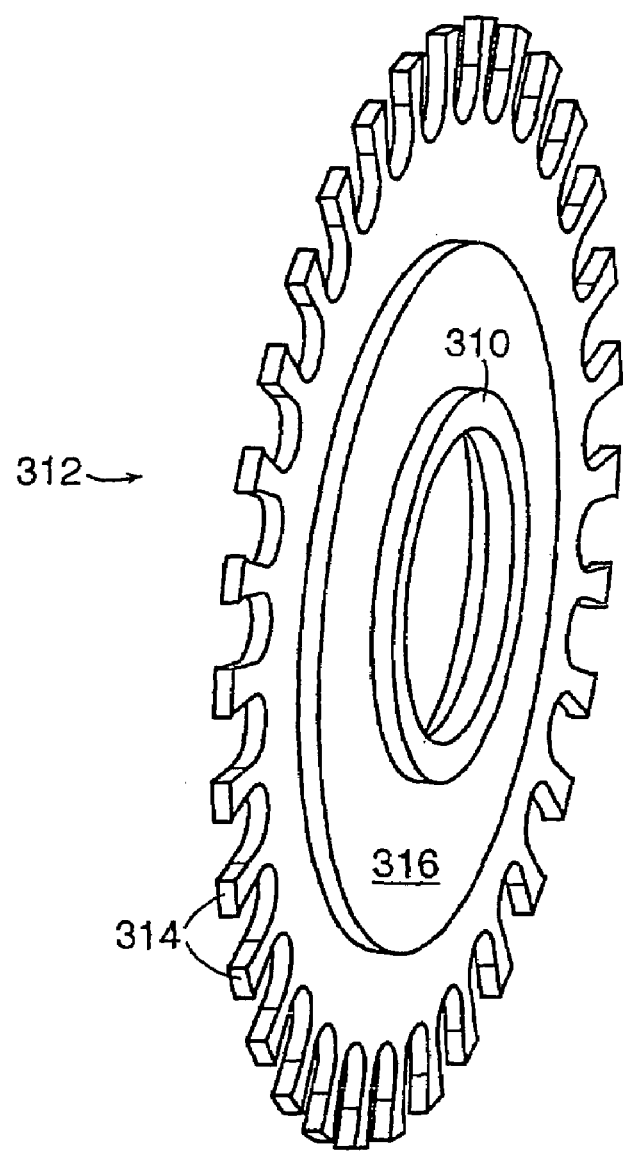

FIG. 6C shows an exploded anterior view of transmission plate 304 from which the wheel motor has been removed to clearly show shaft opening slot 308. Motor 302 is seated within slot ridge 310 of tensioning cam plate 312. The sprockets 314 of cam plate 312 are disposed eccentrically with respect to the slot ridge and the rotation ridge 316, shown in FIG. 6D. Rotation ridge 316 is seated, in turn, in cam plate rotation shelf 318 such that rotation of cam plate 312, in the manner of a Scotch yoke, results in lateral translation of the shaft of the motor while the orientation of the motor with respect to the transmission plate may be kept constant. Once the motor has been translated to the point where a specified belt tension is attained, bolts are tightened to secure the motor housing to the transmission plate through the sprockets of the cam plate, thereby securing the motor against both rotation and translation.

Figure 7A:
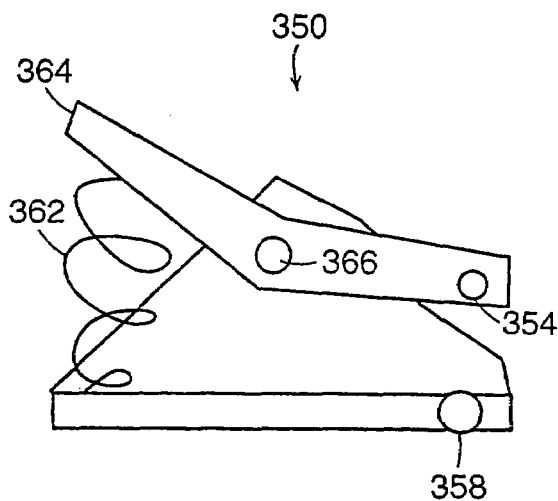
FIG. 7A shows a side view in cross-section of a retaining structure for a user command interface coupling for a personal vehicle showing a differentially frangible coupling between the user command interface and the support of the personal vehicle in accordance with an embodiment of the present invention.
Figure 7B:
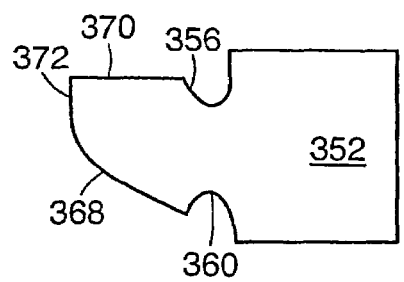
FIGS. 7B and 7C show embodiments of a latching tongue for the differentially frangible coupling mechanism of FIG. 7A.
Figure 7C:
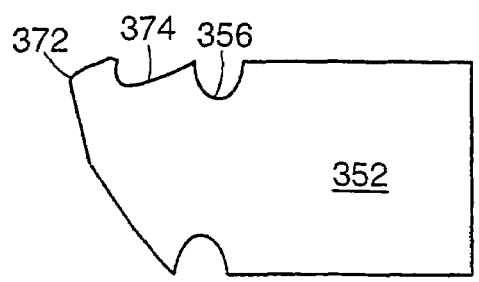

Referring now to FIGS. 7A–7C, a side view is shown in cross-section of a frangible coupling, advantageously employed for retaining a user command interface (not shown) in conjunction with a personal vehicle 10 so that the user command interface may either be attached to an armrest of the vehicle, for example, or detached for remote operation via a cable, such as retractable cable, or via wireless communication with the personal vehicle. In a preferred embodiment of the invention, a user command interface 376 (shown in FIG. 7D) is readily disconnected from armrest 378 (shown in FIG. 7D) of support 12 (shown in FIG. 1) by means of an asymmetrical quick disconnect mechanism 350, shown in a cross-sectional side view in FIG. 7A. FIG. 7B shows a side view in cross-section of an asymmetrical latching tongue for retention by quick disconnect mechanism 350. When latching tongue 352 is engaged in quick disconnect mechanism 350, an upper roller 354 engages upper notch 356 while a lower roller 358 engages lower notch 360. Upper roller 354 is urged downward by compression spring 362 acting against rocker arm 364 which pivots about pivot 366. Since lower face 368 of latching tongue 352 is beveled, the latching tongue, and the user command interface to which it is attached, are relatively easily removed from the quick-disconnect mechanism 350 by pulling the user command interface in an upward direction. By way of contrast, upper face 370 of the latching tongue 352 runs horizontally substantially to the tip 372 of tongue 352. Thus, the user command interface may not be as readily removed from the quick-disconnect mechanism 350 by pressing the user command interface in an downward direction. Typically, a force in excess of 25 pounds is required to remove latching tongue 352 by pushing downward on it with respect to quick disconnect mechanism 350, whereas detachment can be achieved by pulling up on latching tongue with a force not exceeding 2 pounds. This differential frangibility is advantageous in preventing accidental detachment and breakage of the user command interface. Since notches 356 and 360 are substantially parallel grooves over the width of the latching tongue 352, there is substantially no free play in the captured tongue, and side breakaway forces are substantially greater than either upward or downward breakaway forces. Of course, within the scope of the invention, the grooves may be oriented otherwise so as to provide differential frangibility favoring extraction of the tongue toward any specified direction, as will be readily evident to a person skilled in the art. FIG. 7C shows a cross-sectional view from the side of latching tongue 352, wherein, in accordance with an alternate embodiment of the present invention, an auxiliary groove 372 is provided between upper groove 356 and tip 372. If the user command interface is accidentally detached by force applied in a downward direction and upper roller 354 no longer engages upper groove 356, upper roller 354 will still engage auxiliary groove 374 and the unit will not detach freely, as a safety feature and to prevent breakage.

Figure 7D:
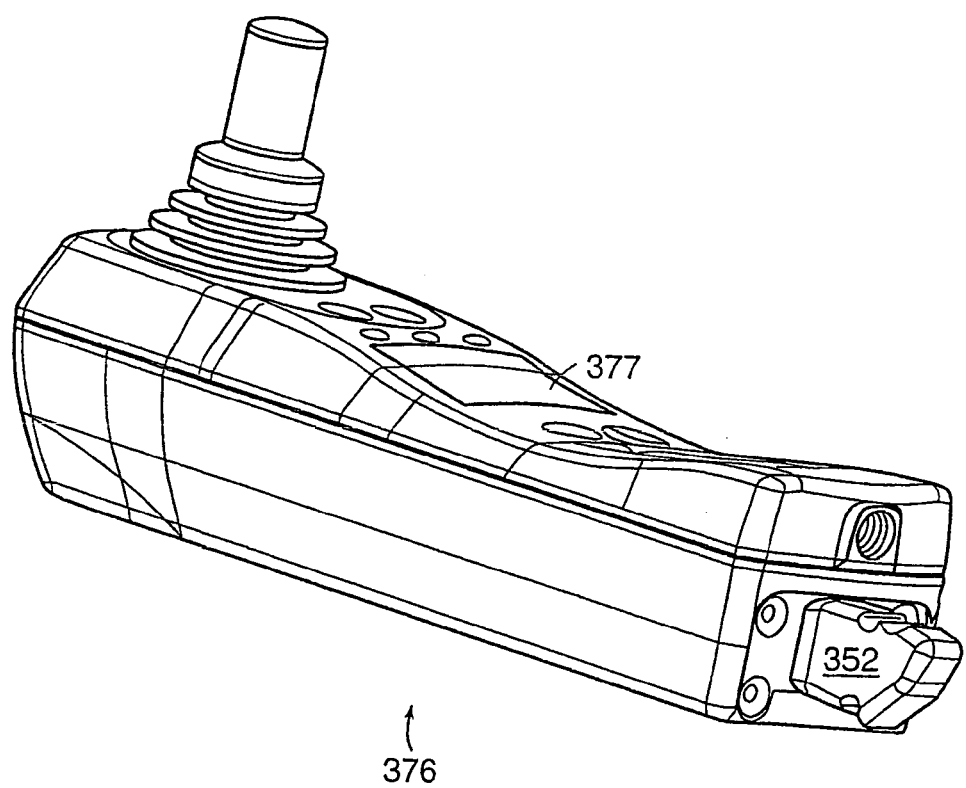
FIG. 7D is a perspective view of a user command interface for a personal vehicle showing a latching tongue for the differentially frangible coupling of FIG. 7A.
Figure 7E:
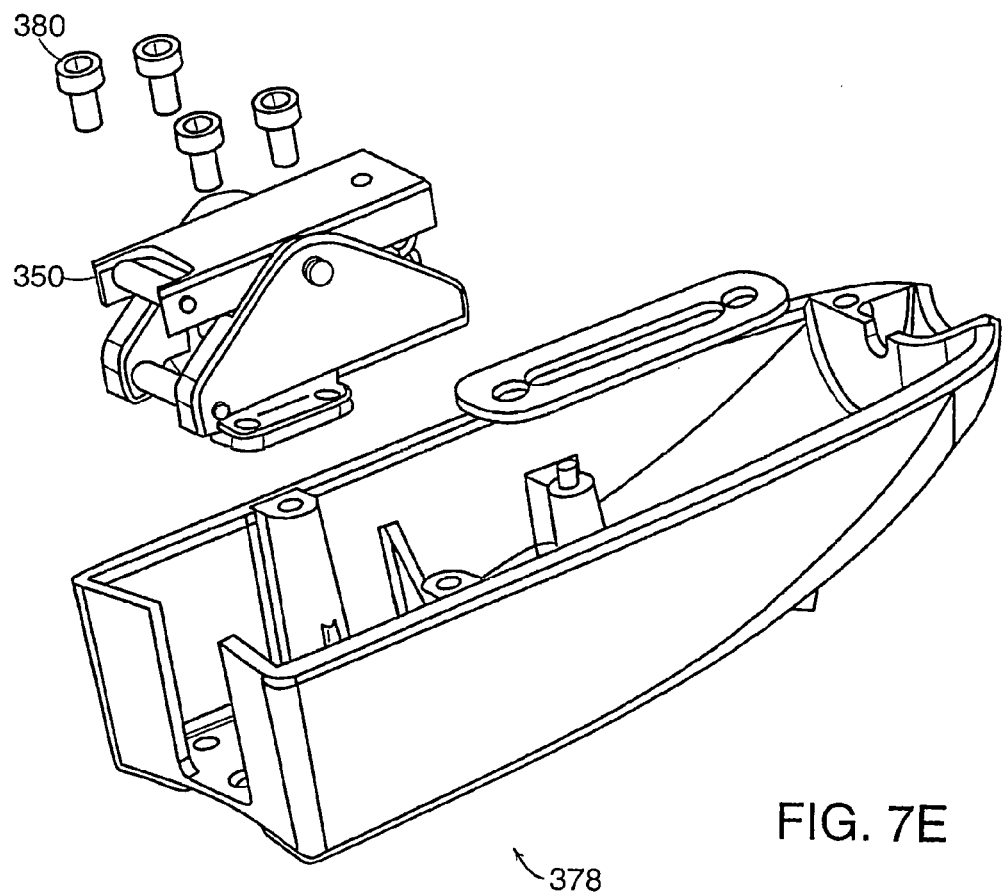
FIG. 7E is an exploded view of the assembly of the differentially frangible quick disconnect mechanism of FIG. 7A to the armrest of a personal vehicle in accordance with an embodiment of the invention.

Referring now to FIG. 7D, a perspective view is shown of a user command interface 376 for a personal vehicle showing latching tongue 352 of the differentially frangible coupling mechanism that has been described. An exploded view is shown in FIG. 7E of the assembly of the differentially frangible quick disconnect mechanism 350 of FIG. 7A to armrest 378 of a personal vehicle by means of fasteners such as screws 380. In accordance with an embodiment of the invention, one of a series of icons may be displayed to the user on visual display monitor 377 (shown in FIG. 7D), with each distinct icon characterizing a corresponding mode of operation of the personal vehicle.

Figure 8A:
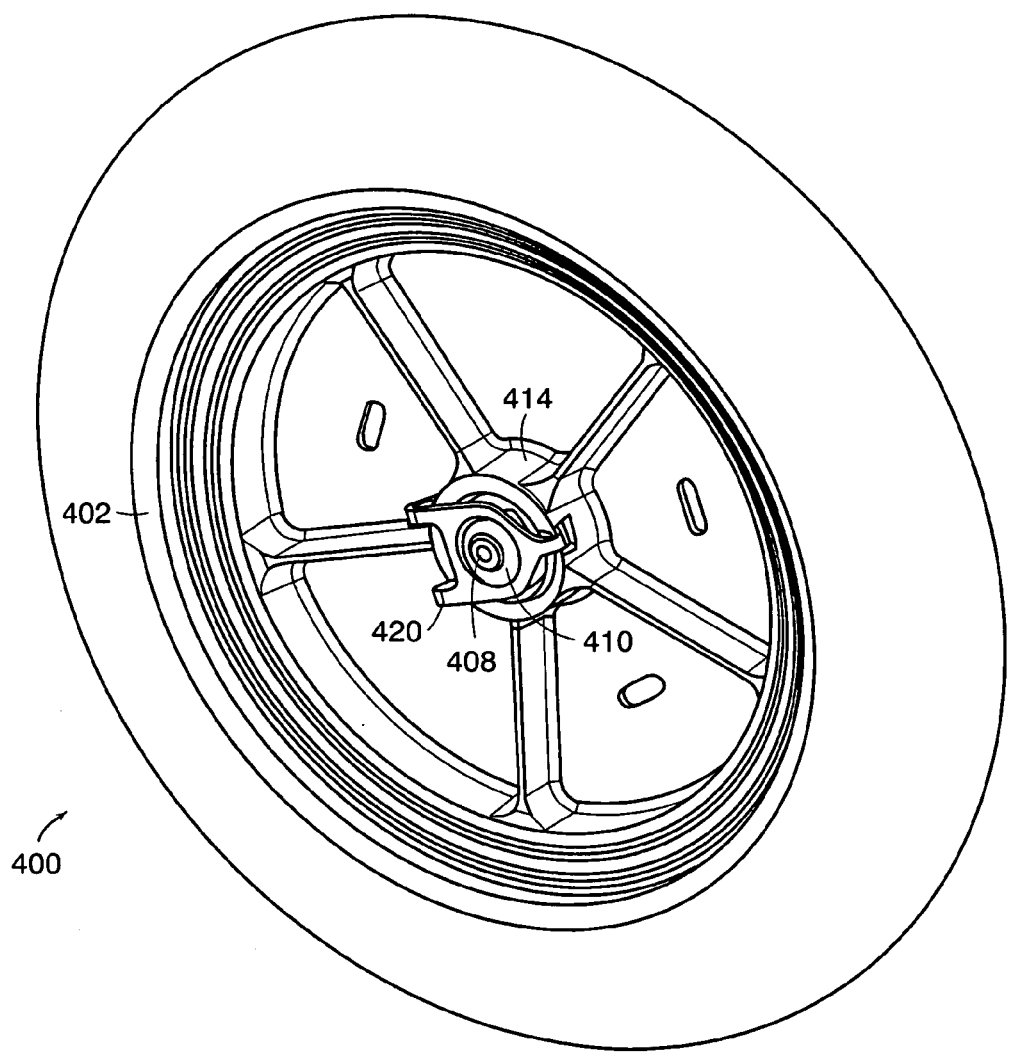
FIGS. 8A and 8B show side views of a wheel assembly including a self-pulling wheel mechanism in accordance with an embodiment of the present invention.
Figure 8B:
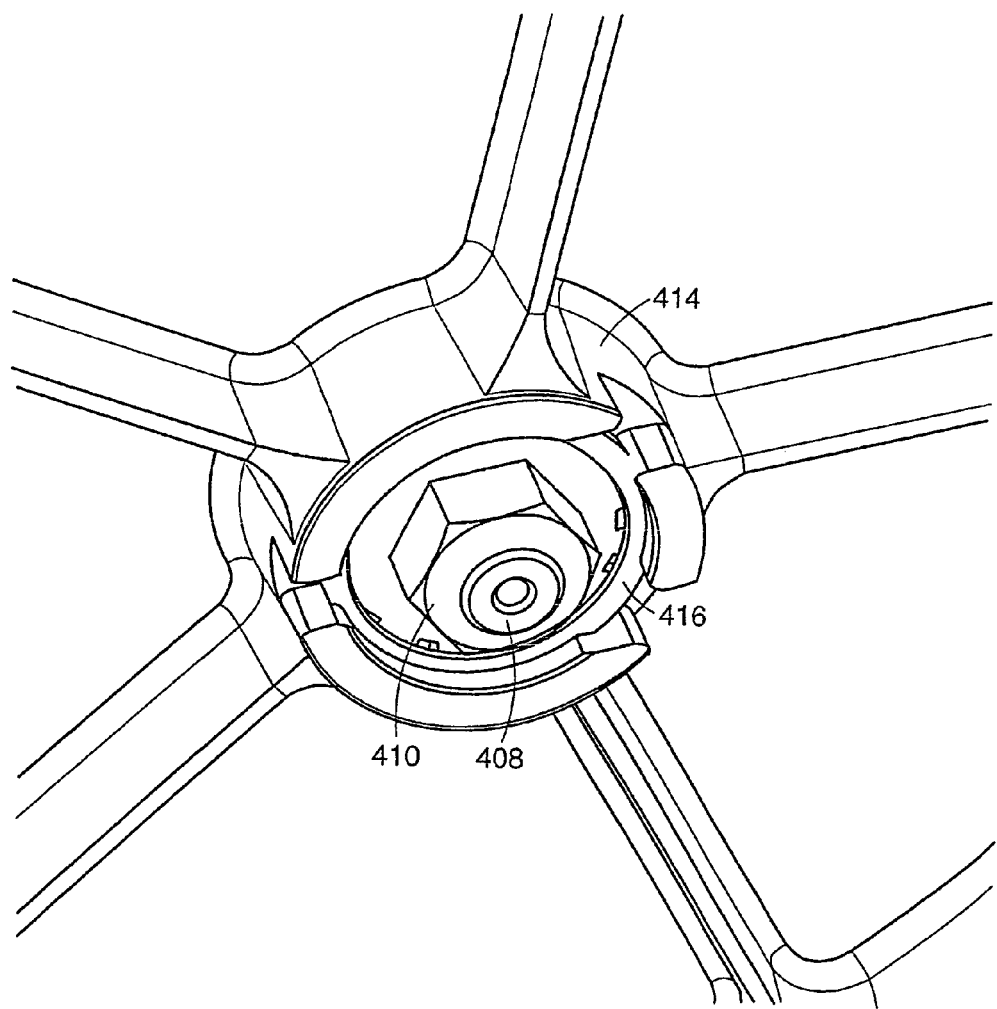
Figure 8C:
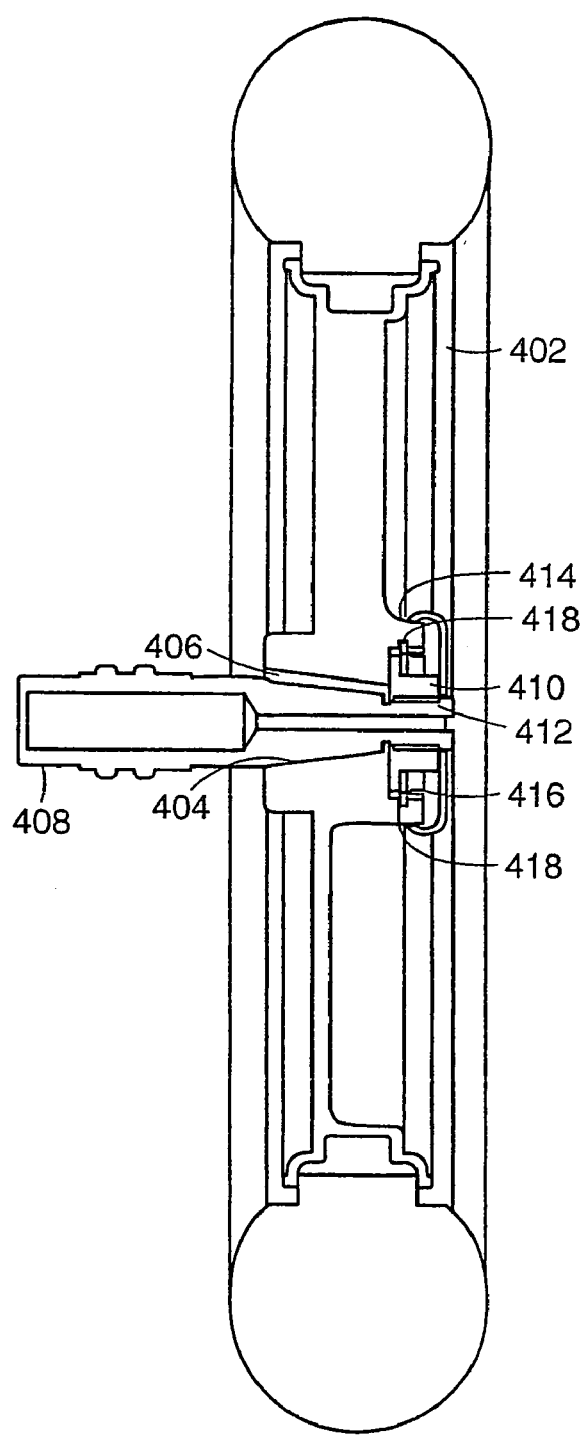
FIG. 8C shows a cross-sectional side view of the self-pulling wheel mechanism of FIG. 8A.

Referring now to FIGS. 8A–8C, a self-pulling wheel assembly 400 is shown for removal of a wheel 402. FIGS. 8A and 8B show side views of the components of the assembly, while FIG. 8C shows a cross-sectional view. Axle bore 404 of wheel 402 has a tapered inside surface 406 corresponding to the taper of axle 408 so that torque may be transferred from axle 408 to the wheel. Wheel 402 is mounted by pressing axle bore 404 onto axle 408 by driving wheel nut 410 onto threaded spindle 412 of axle 408. Wheel nut retention clip 420 retains the wheel nut against rotation with respect to the wheel hub. Hub 414 of wheel 402 has a retaining snap ring 416 that is snapped into an annular groove 418 behind wheel nut 410. Thus, wheel nut 410 is captured between the wheel and the retaining ring. Retaining ring 416, in a preferred embodiment, is a snap ring. By unscrewing nut 410 in an outward direction, an outward force is exerted on hub 414 through ring 416, thereby pulling the wheel 402 off axle 408. Thus the wheel may advantageously be pulled without application of a separate puller tool.

Figure 9A:
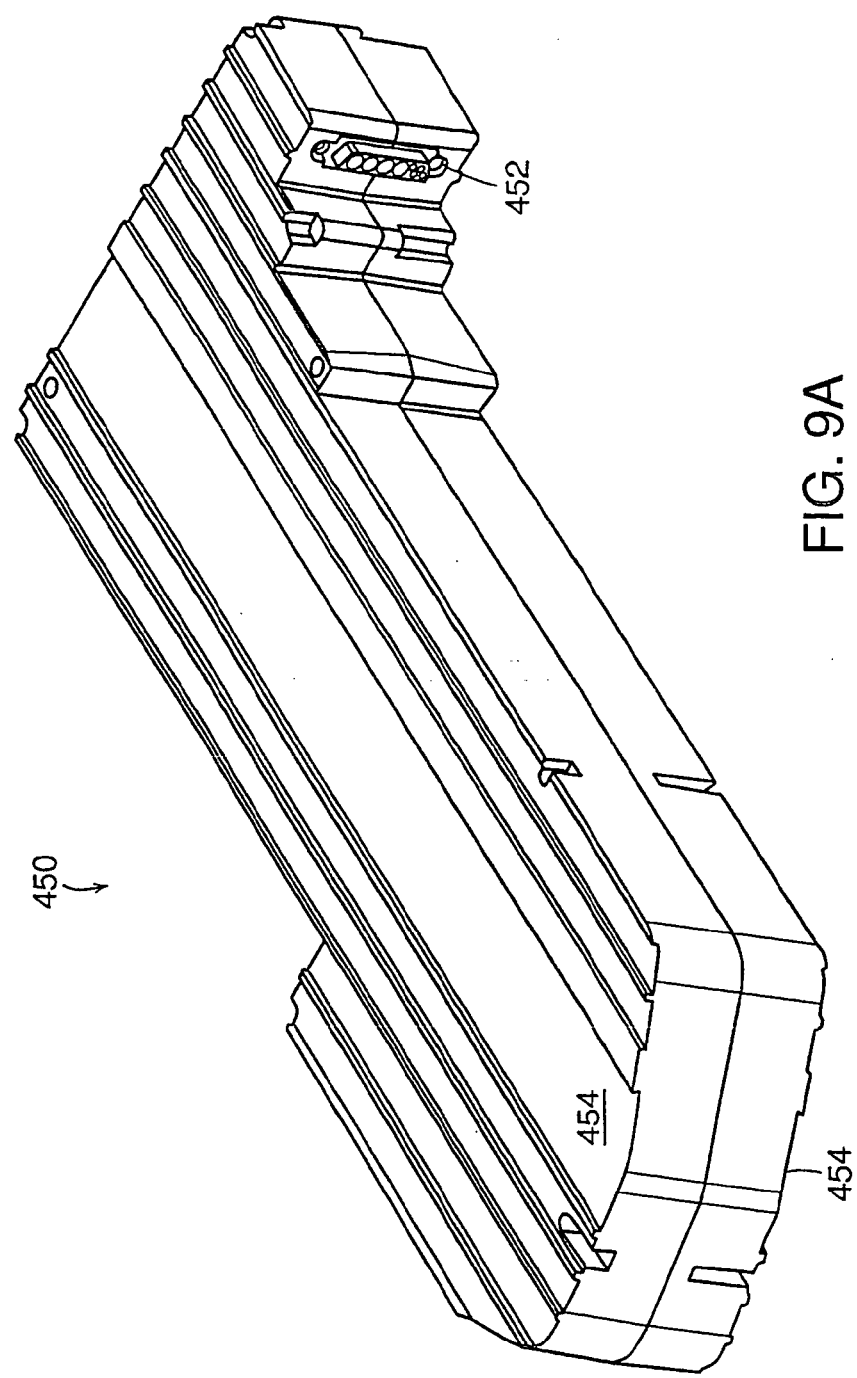

Referring now to FIG. 9A, a perspective view is shown of a battery pack, designated generally by numeral 450, that may be used to supply electrical power to a personal vehicle. Any source of electrical power internal to battery pack, such as chemical cells of any sort known in the art, is within the scope of the present invention. Battery pack 450 is configured, as will be described, for convenient insertion and extraction of the battery pack to provide for ready switchout when it becomes necessary to renew or recharge the energy source, or for disassembly and shipping of the personal vehicle. In accordance with a preferred embodiment of the invention, up to two power packs 450 are borne by the power base 6 (shown in FIG. 1) of personal vehicle 10 beneath seat pan 28 and proximate to the seat. Electrical power is supplied by battery pack 450 to power base 6 via electrical connector 452 that engages a mating connector (not shown) when battery pack 450 is fully inserted into a battery tray in the power base. Battery pack 450 is guided into position in the battery tray by guides 460 extending above shelf 462 of the battery tray, as shown in FIG. 9B. Guides 460 ride within battery tray slots 454 as the battery pack is removed or inserted, thus ensuring straight insertion and proper coupling of connector 452 with its counterpart in the power base. After insertion of one of the battery packs 450, retaining latch 464 (shown in FIG. 9B) is closed behind the inserted battery pack, urging the pack into its fully inserted position and into electrical contact with the power base. When retaining lever 464 is opened, battery pack 450 is urged out of its inserted position, and out of electrical contact with the power base, by operation of a compressed spring (not shown) against spring ledge 456. Thus, power is not delivered by the battery pack unless it is affirmatively retained by the battery retaining latch 464. Battery pack 450 and the battery tray of the power base have complementary symmetries, such that battery pack 450 may be inserted into either the left-hand or right-hand battery slot by rotating the battery pack about its long axis. In a preferred embodiment, each battery pack powers a separate power base control circuit, thus providing full redundancy. Additionally, the interchangeability of the battery packs 450 may advantageously prolong the lifetime of the battery packs if the power drain on the respective sides of the battery tray is uneven.

FIG. 9B shows shelf 462 of the battery tray with the right battery retaining latch 464 shown in a closed position, and the left battery retaining latch 466 shown in an open position. Lever locking sleeve 468 slides over both left and right retaining latches, thus locking both battery packs in place for safety of operation.

Figure 10A:
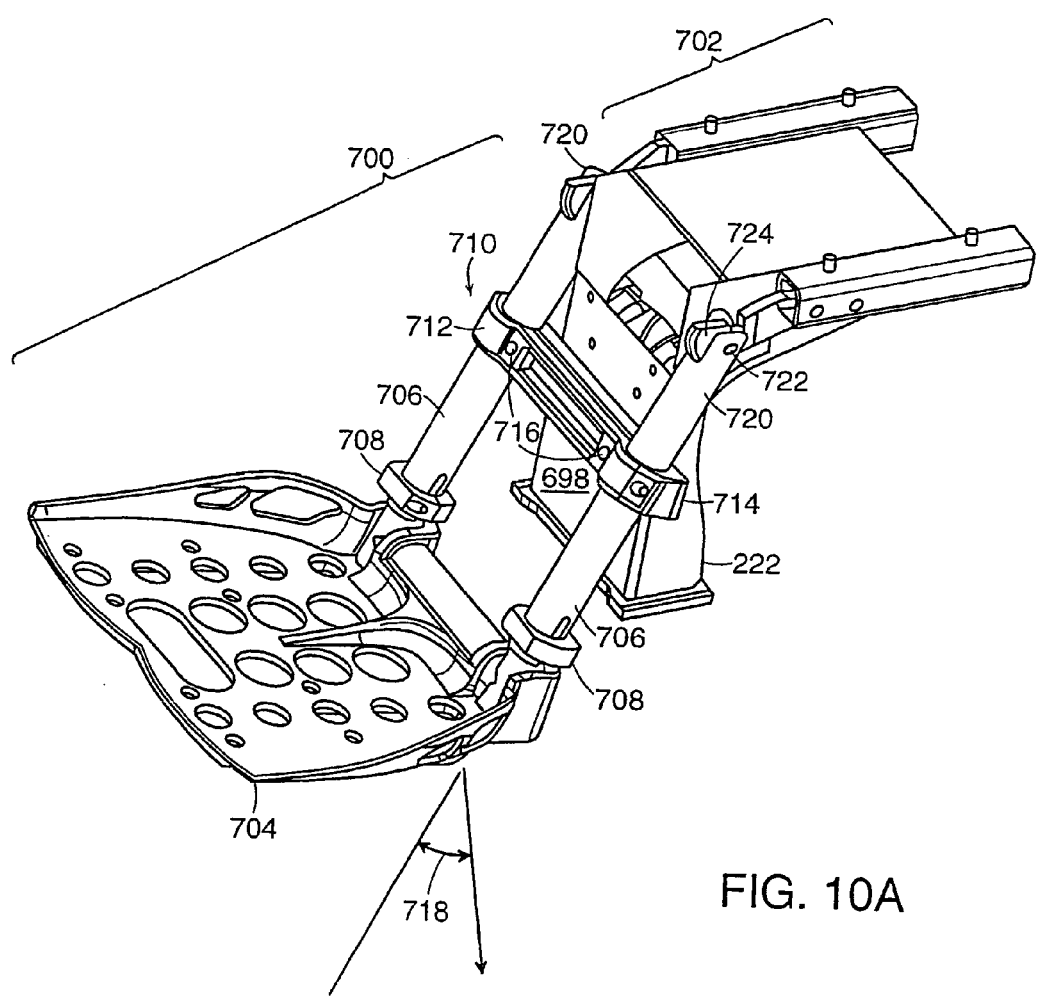
FIGS. 10A–10C show views of a removable footrest assembly for a wheelchair-type vehicle in accordance with an embodiment of the present invention.

FIG. 10A is a perspective view of a footrest assembly, designated generally by numeral 700, attached to seat pan assembly 702. The rear portion of the seat pan assembly has been cut away for easier viewing. A footrest 704 is attached to a pair of lower footrest legs (not shown) which telescope inside the upper footrest legs 706 thereby providing a footrest length adjustment. The lower legs are locked in place by a pair of extension locks 708. A tilt adjustment assembly 710 spans the two upper footrest legs 706 and can slide along the upper footrest legs. Tilt assembly 710 includes a front piece 712 and a rear 714 piece that are attached to each other by screws 716. The ends of the front and rear pieces capture the upper legs. When screws 716 are loosened, tilt assembly 710 can slide along the upper legs 706 but when screws 716 are tightened, the tilt assembly 710 is locked into place. Rear tilt assembly piece 714 extends perpendicular to the plane defined by the two upper legs and rests against the caster mount face 698 of caster mount 222. Moving the tilt assembly 710 upward on the upper legs 706 increases the tilt angle 718 of the footrest assembly 700. The terminal end 720 of each of the upper legs 706 is cut away to engage the footrest assembly 700 onto the seat pan assembly 702. The terminal end of each of the upper legs has a footrest mounting pin 722 that engages the footrest assembly mount 724 and forms a pivot for the tilt assembly.

Figure 10B:
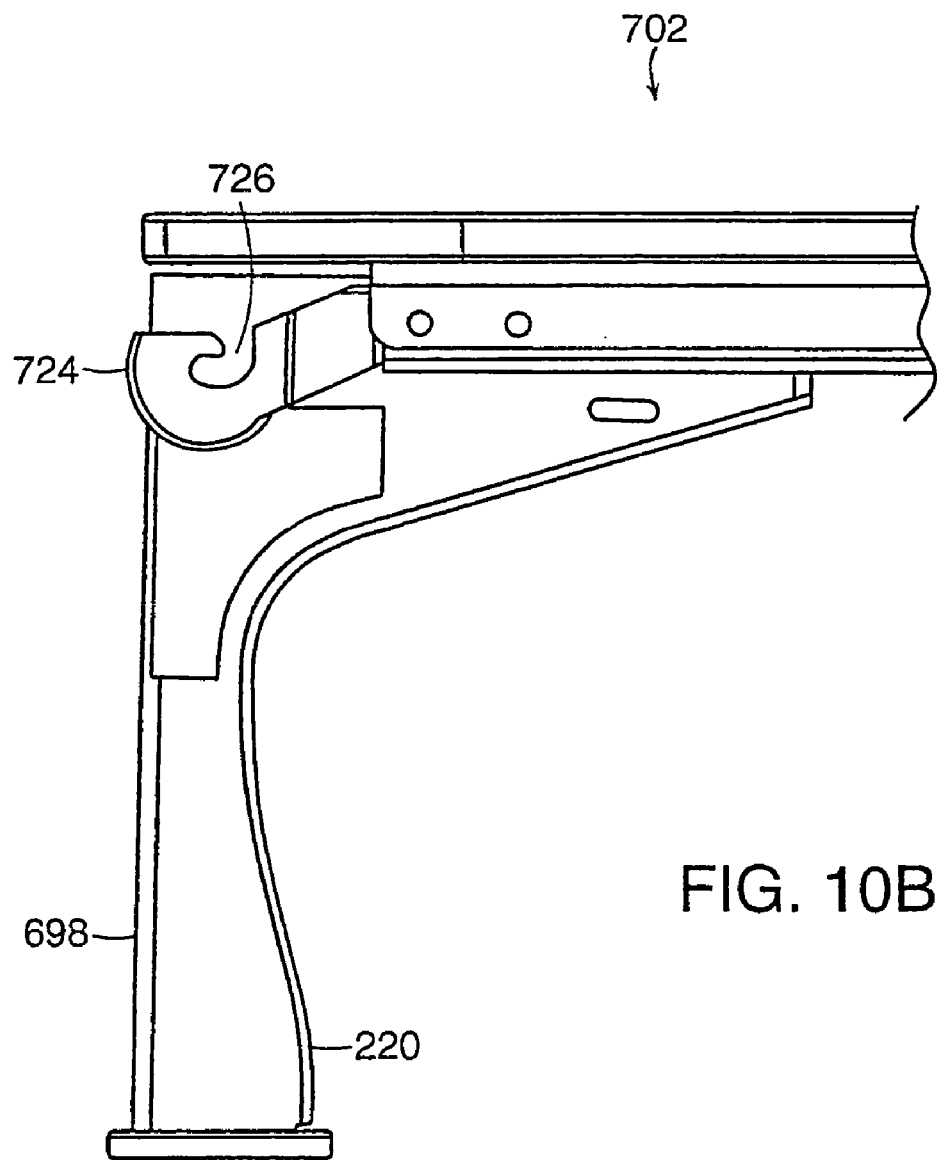
Figure 10C:
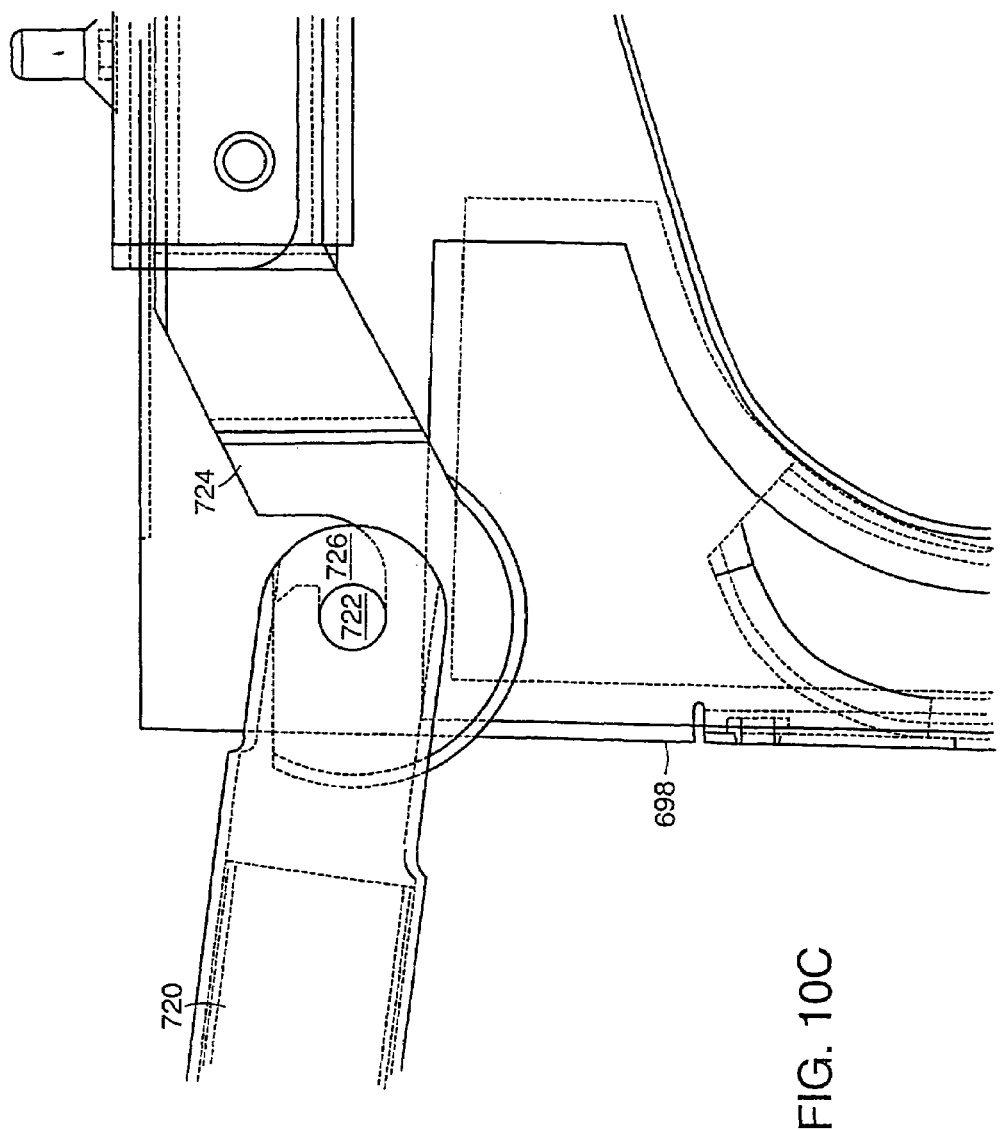

FIG. 10B is a side view of the seat pan assembly 702. Footrest assembly mount 724 has a truncated elliptical profile with a J slot 726 to accommodate the footrest mounting pin 722 (shown in FIG. 10A).FIG. 10C shows a detailed side view of the terminal ends 720 of the footrest assembly engaging the footrest assembly mount 724. Terminal ends 720 of the footrest assembly are initially positioned perpendicular to the caster mount face 698 and are slid into the footrest assembly mount 724 until the mounting pin 722 slides into the J slot 726 of the assembly mount. The truncated elliptical profile is preferred so that the terminal ends of the footrest assembly can slide over the truncated portion of the assembly mount. The terminal ends have a front cut-away and a rear cut-away. The depth of the front cut-away is dimensioned such that when the mounting pin is at the end of the J slot, the terminal end can be rotated into the downward configuration without interference between the front cut-away and the curved portion of the assembly mount while at the same time preventing upward motion of the footrest assembly relative to the assembly mount. The rear cut-away depth is dimensioned to allow the terminal ends to slide over the assembly mount during mounting or dismounting of the footrest assembly from the seat pan assembly. In accordance with the embodiments described, the footrest assembly may advantageously be disassembled from the personal vehicle without operation of any screws or other fasteners and without the use of tools.

Figure 11A:
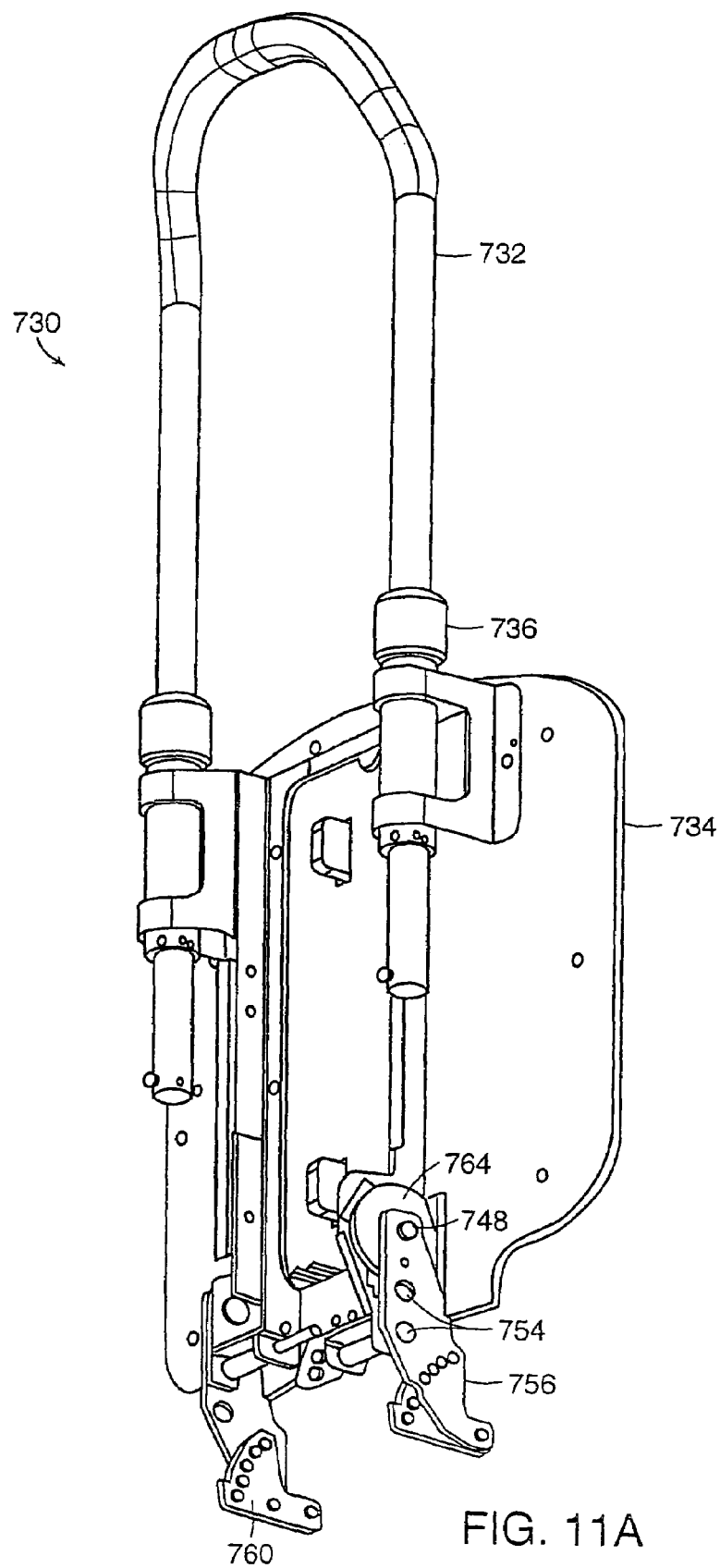
FIGS. 11A and 11B show components of an extensible attendant handle and seat back orientation sensor mechanism for a wheelchair-type vehicle in accordance with an embodiment of the present invention.

FIG. 11A shows a seat back assembly 730 for a personal vehicle, with the seat back cover removed. In accordance with a preferred embodiment of the invention, a handle 732 is provided to permit an assistant to exert forces on the vehicle. Operation of a balancing personal vehicle in an assisted mode of operation is described in copending provisional application 60/124,403. The height of handle 732 may be adjusted, typically over a range of 18–20 inches above seat back 734, using any method of locking telescoping members known in the mechanical arts, such, for example, as wedge clamps secured by tightening of handle adjustment locks 736.

Figure 11B:
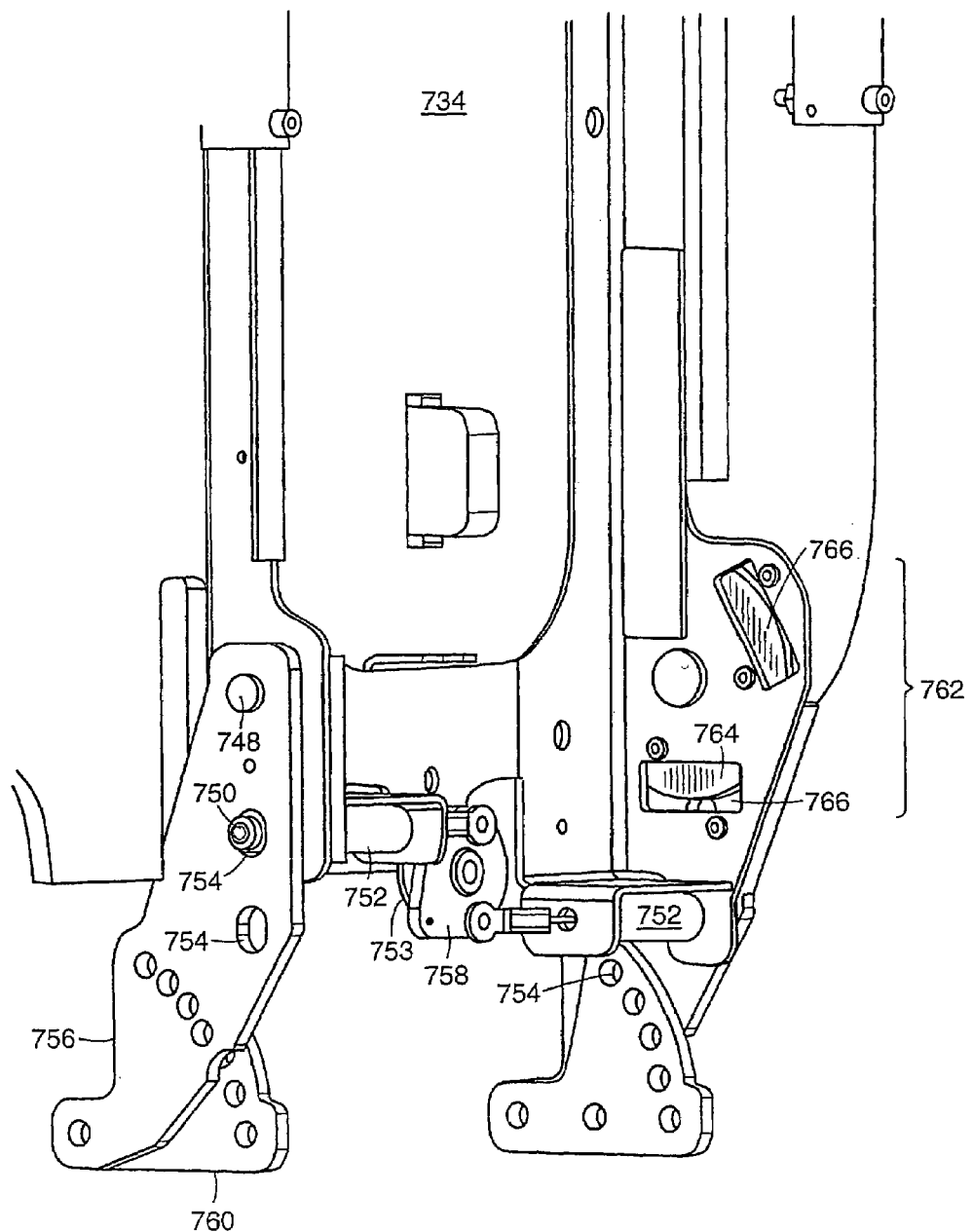

Referring to FIG. 11B, seat back 734 may be tilted and locked in various tilted positions by engaging locking pins 750, urged by locking pin springs 752, into one of several locking pin holes 754 as seat back 734 pivots about tilt pivot 748. Tilt plates 756 disposed on either the right or left sides of the seat pan, or both, allow adjustment of the seat back with respect to seat pan mount 760 to fit the user. Locking pins 750 are activated by a cable actuating a locking pin cam 758 or otherwise as known to persons skilled in the mechanical arts.

Figure 11C:
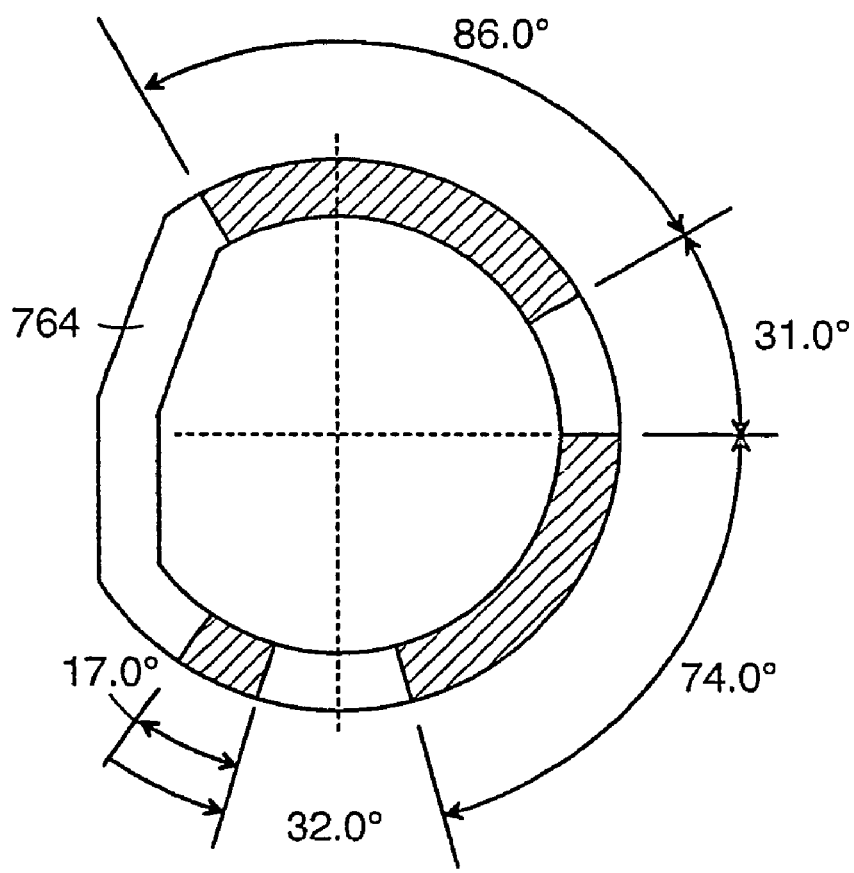
FIG. 11C shows a front view of a magnetic sensor disk component of an orientation sensor mechanism in accordance with an embodiment of the present invention.

In order to provide information to controller 2 as to the current position of seat back 734, a sensor mechanism 762 is provided. Sensor mechanism 762 includes a magnetized orientation plate 764 with respect to which the seat back moves as it is being tilted, and magnetic sensors fixed with respect to the seat back. In a preferred embodiment, two magnetic sensors, such as Hall effect sensors, for example, are mounted in sensor mounting holes 766 so as to sense the pattern of magnetization of orientation plate 764 as it passes by the sensors. The magnetization pattern of magnetized orientation plate 764, in accordance with a preferred embodiment, is shown in FIG. 11C, where the hatched areas are south magnetic pole and the unhatched areas are north pole. The asymmetry of the magnetization pattern allows the resolution, with redundancy, of three positions using only two sensors. The use of differing magnetization patterns and numbers of sensors are also within the scope of the invention.

The location of the center of gravity (CG) of the user is important on a dynamically stabilized personal vehicle because it determines the desired pitch angle which the power base tries to maintain whether operated in a balancing mode, on fewer than three wheels, or in an enhanced stability mode wherein the vehicle may otherwise be statically stable. The CG plays a role in determining the stability even of a vehicle operated in a mode that is not actively stabilized. Therefore, it is desirable to provide for controlling the location of the user's CG via seat adjustments.

Figure 12A:
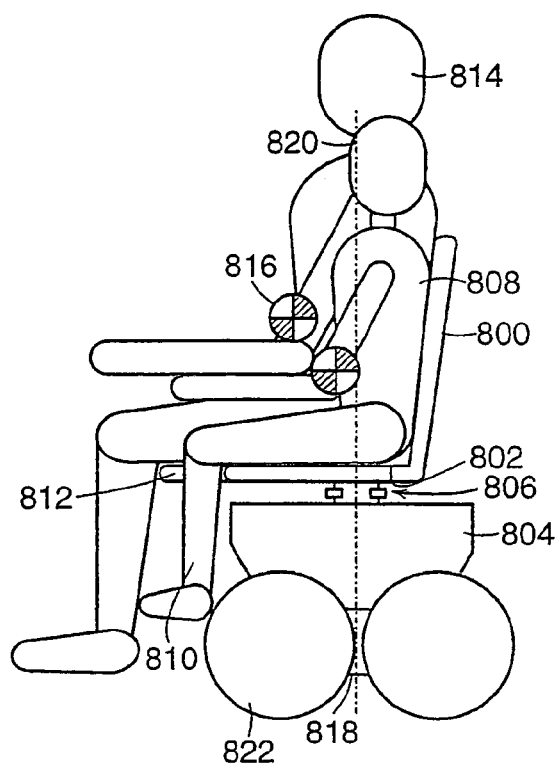
FIGS. 12A and 12B show diagrams illustrating mechanisms for adjusting the seat depth of the seat back of a personal vehicle, in accordance with embodiments of the present invention.

FIG. 12A shows a schematic diagram of one seat adjustment scheme, in accordance with an embodiment of the invention, where back frame 800 of seat 802 is fixed in location with respect to power base 804. Seat 802, which is attached to power base 804 via seat quick-disconnect 806 discussed above in reference to FIG. 5, is positioned for the smallest likely user 808 so that the user's legs 810 can clear the power base 804, and then the seat pan 812 is lengthened to accommodate larger users 814. Although mechanically simple, this seat adjustment scheme results in the CG 816 of the large user being far forward of the desired position, which is directly over the cluster axis 818, along a line designated 820. The problem is further exacerbated by the fact that the largest user is also the heaviest, making the gravitational torque placed on the system by the user (about the point of contact 822 of the forward wheel, for example) dramatically larger.

Figure 12B:
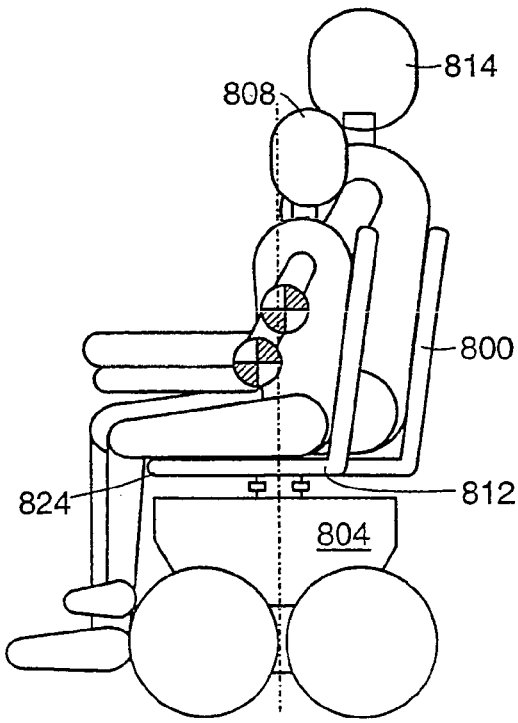

FIG. 12B shows a further seat adjustment scheme, in accordance with a preferred embodiment of the invention, where the front edge 824 of the seat pan 812 is fixed with respect to the power base 804, and the seat size is adjusted by moving the seat back in the aft direction. This results in the CG of the large user 814 and the CG of the small user 808 remaining relatively close to the desired location. To further optimize the seat adjustment, the entire seat location may be made adjustable in the fore-aft direction, allowing optimal placement of the CG for all users.

Figure 13A:
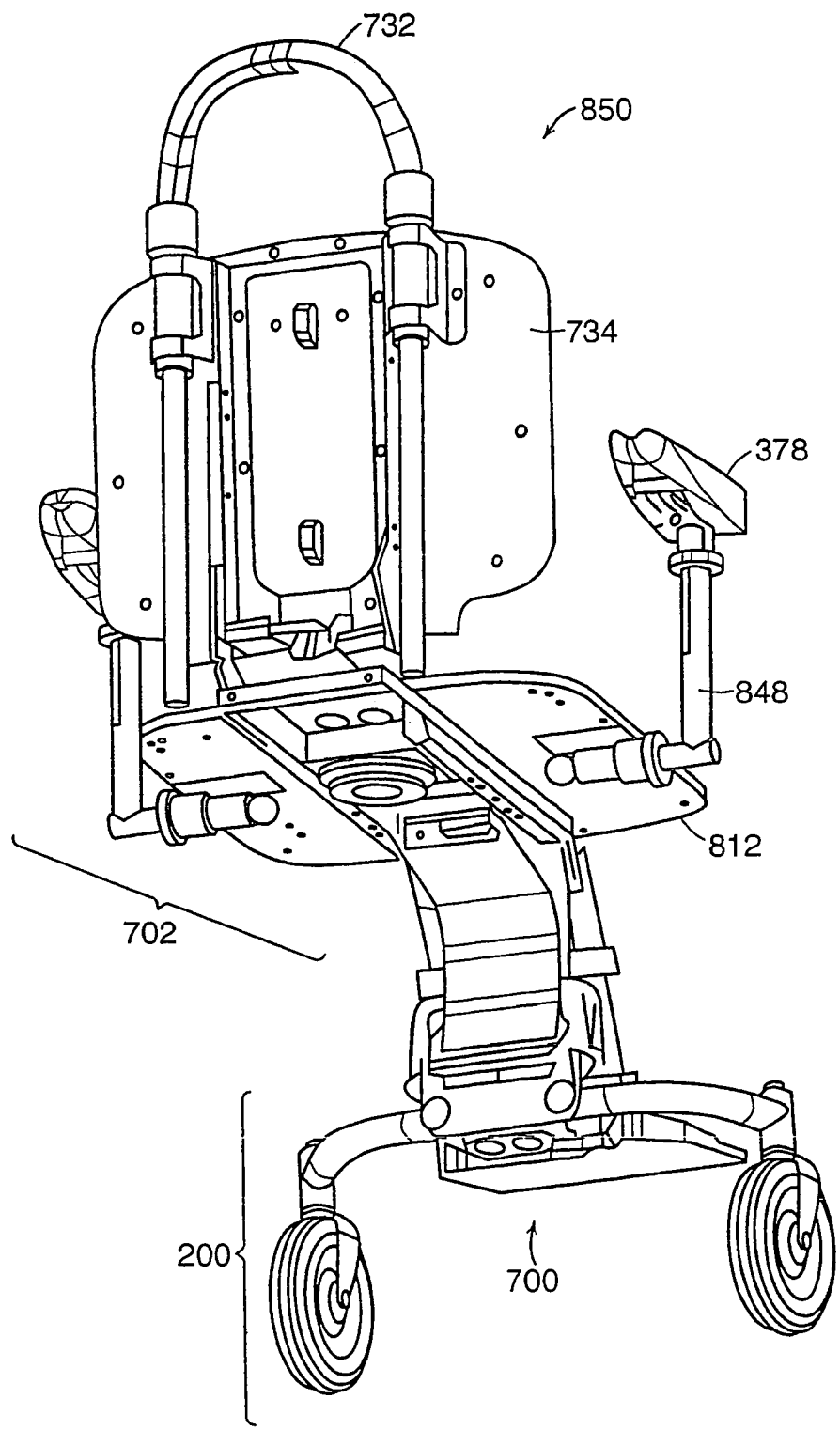
FIGS. 13A and 13B show perspective views of an embodiment of a seat assembly for use with a personal vehicle in accordance with an embodiment of the present invention.
Figure 13B:
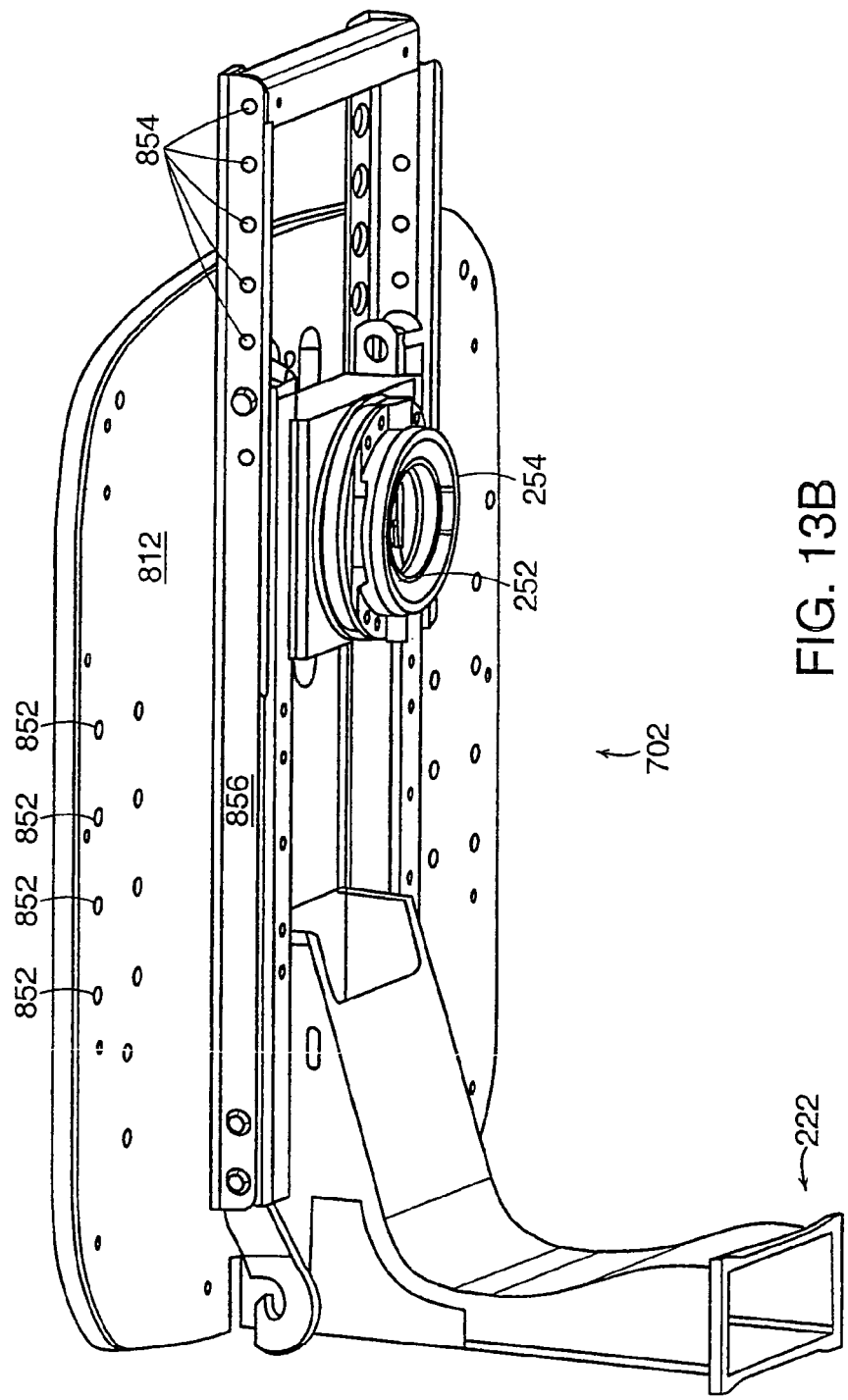
Figure 13C:
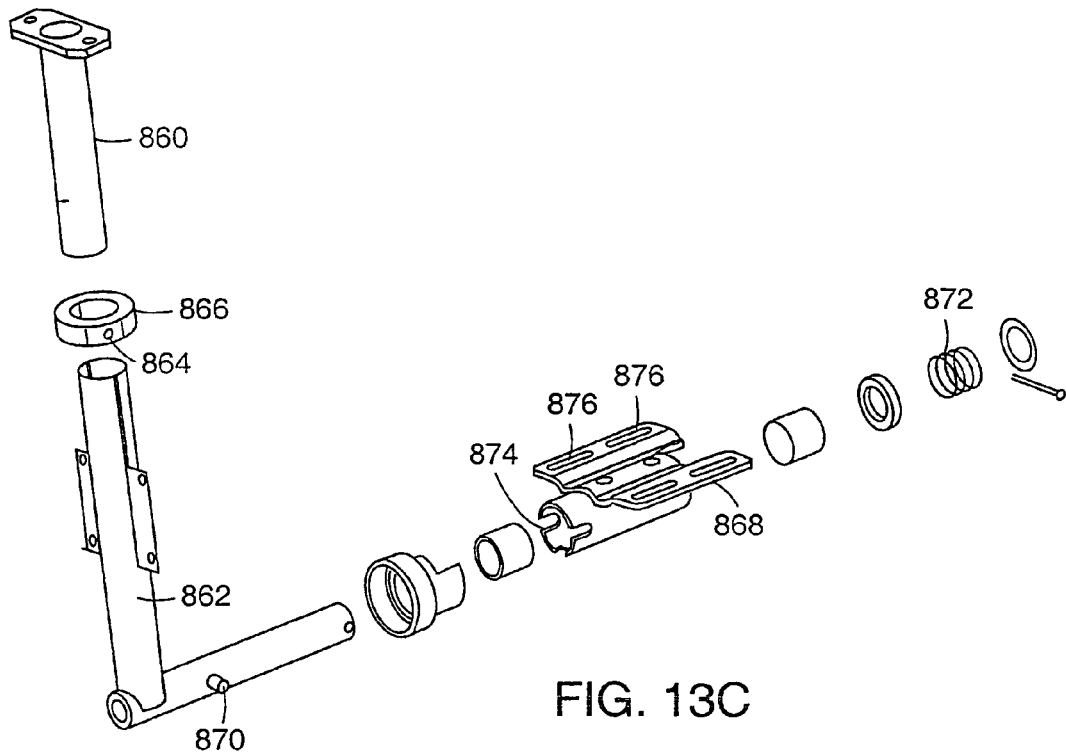
FIGS. 13C and 13D show exploded and assembled views, respectively, of a rotatable armrest support for use with a personal vehicle in accordance with an embodiment of the present invention.
Figure 13D:
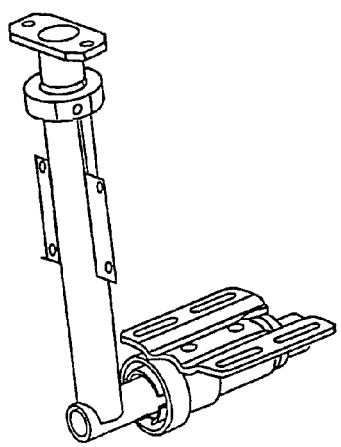

Referring now to FIG. 13A, a perspective view is shown of an embodiment of a seat assembly 850 for use with a personal vehicle. Caster assembly 200 is shown, as described above with reference to FIGS. 2–4. Also shown are footrest assembly 700 (described with reference to FIGS. 5A–5B), seat pan 812, armrest 378, rotatable armrest support 848, extensible attendant handle 732, and seat back 734. The seat pan assembly, designated generally by numeral 852, is shown in greater detail in the perspective view from below of FIG. 13B. Seat pan 812 is drilled with armrest assembly mounting holes 702 for attachment of an armrest assembly as described below. The multiplicity of armrest assembly mounting holes, along with the provision for changing the size of the seat pan allow flexibility in tailoring the seating arrangement to the dimensions of the occupant of the seat. To provide additional flexibility, and to optimize placement of the CG of the user as discussed above with reference to FIGS. 12A and 12B, multiple seat back assembly mounting holes 854 are provided in seat runner weldment 856. Flange 254 of seat stem 252 is shown as used in conjunction with the seat quick-disconnect mechanism described above in reference to FIGS. 5A and 5B. FIG. 13C shows an exploded view of rotatable armrest support 848, and FIG. 13D shows an assembled view of the same rotatable armrest support. The height of armrest 378 (shown in FIG. 13A) may be adjusted to suit the user, in accordance with an embodiment of the invention, by raising or lowering upper riser weldment 860 which slides inside armrest bracket weldment 862. Upper riser weldment 860 is locked into place by tightening torque collar screw 864 on shaft collar 866. Pivot weldment 868 is notched to accept armrest tilt locking pin 870 on armrest bracket weldment 862 so as to lock the armrest riser in the upright position. The armrest may be rotated by pulling the armrest riser outward, thereby compressing spring 872 and disengaging pin 870 from notch 874. Slots 876 allow for adjustment of the position of the armrests as weldment 868 is secured to the seat pan.

The described embodiments of the invention are intended to be merely exemplary and numerous variations and modifications will be apparent to those skilled in the art. All such variations and modifications are intended to be within the scope of the present invention as defined in the appended claims.

We claim:

1. A self-pulling mechanism for a wheel having a tapered axle bore and a hub, the mechanism comprising:
   a. an axle having a taper corresponding to the bore of the wheel and a threaded end;
   b. a retaining ring seated on an inside groove of the hub of the wheel; and
   c. a wheel nut having a threaded bore corresponding to the threaded end of the axle such that upon tightening the wheel is retained on the axle and upon loosening a force is applied to the retaining ring for removing the wheel from the axle.

2. A self-pulling mechanism in accordance with claim 1, further comprising a wheel nut retention clip for retaining the wheel nut against rotation with respect to the hub.

3. A self-pulling mechanism in accordance with claim 1, wherein the hub includes a retaining snap ring capable of being snapped into an annular groove behind the wheel nut.

* * * * *